United States Patent
Maggiore

(10) Patent No.: US 12,493,276 B2
(45) Date of Patent: Dec. 9, 2025

(54) SYSTEM FOR REMOTE OPERATION OF NON-NETWORKED PRODUCTION EQUIPMENT UNITS

(71) Applicant: Apprentice FS, Inc., Port Jefferson Station, NY (US)

(72) Inventor: Frank Maggiore, Port Jefferson Station, NY (US)

(73) Assignee: Apprentice FS, Inc., Port Jefferson Station, NJ (US)

( * ) Notice: Subject to any disclaimer, the term of this patent is extended or adjusted under 35 U.S.C. 154(b) by 949 days.

(21) Appl. No.: 17/578,953

(22) Filed: Jan. 19, 2022

(65) Prior Publication Data

US 2022/0229413 A1    Jul. 21, 2022

Related U.S. Application Data

(60) Provisional application No. 63/140,122, filed on Jan. 21, 2021.

(51) Int. Cl.
    *G05B 19/409* (2006.01)
    *G06F 21/86* (2013.01)

(52) U.S. Cl.
    CPC .......... *G05B 19/409* (2013.01); *G06F 21/86* (2013.01)

(58) Field of Classification Search
    None
    See application file for complete search history.

(56) References Cited

U.S. PATENT DOCUMENTS

| 897,558 | A | 9/1908 | Scherl |
| 6,708,385 | B1* | 3/2004 | Lemelson ............... B23Q 7/03 29/563 |
| 9,530,050 | B1 | 12/2016 | Erol et al. |
| 10,984,520 | B2* | 4/2021 | Ueda ...................... G06Q 50/04 |
| 11,145,130 | B2 | 10/2021 | Maggiore et al. |
| 2004/0162670 | A1* | 8/2004 | Brown ............... B64D 45/0015 701/110 |

(Continued)

OTHER PUBLICATIONS

Notice of Allowance received in U.S. Appl. No. 16/700,851 dated Jun. 21, 2021.

(Continued)

*Primary Examiner* — Thomas C Lee
*Assistant Examiner* — Anzuman Sharmin
(74) *Attorney, Agent, or Firm* — Run8 Patent Group, LLC; Peter Miller

(57) ABSTRACT

One variation of a system includes: a chassis located over a physical user interface of a production equipment unit that includes a set of physical input fields; a set of actuators coupled to the chassis; a selector manipulated by the set of actuators and interfacing with the set of physical input fields; a communication module configured to receive a command—corresponding to a virtual input entered by a remote operator at a virtual user interface representing the physical user interface and depicted within an operator portal remote from the production equipment unit—during a procedure at the production equipment unit; and a controller configured to: drive the set of actuators according to the command to manipulate the selector across a physical input field on the physical user interface and thus physically reproduce the virtual input at the physical user interface of the production equipment unit.

20 Claims, 7 Drawing Sheets

(56) References Cited

U.S. PATENT DOCUMENTS

| | | | |
|---|---|---|---|
| 2006/0247800 A1* | 11/2006 | Takenaka | B62D 57/032 |
| | | | 700/54 |
| 2012/0249588 A1 | 10/2012 | Tison et al. | |
| 2013/0010068 A1 | 1/2013 | Tiernan et al. | |
| 2013/0120449 A1 | 5/2013 | Ihara et al. | |
| 2013/0281209 A1 | 10/2013 | Lyons et al. | |
| 2013/0325182 A1* | 12/2013 | Setrakian | B25J 9/161 |
| | | | 700/264 |
| 2014/0232636 A1 | 8/2014 | Hara | |
| 2014/0299057 A1* | 10/2014 | Daykin | B05B 14/30 |
| | | | 118/713 |
| 2015/0084989 A1 | 3/2015 | Laughlin et al. | |
| 2016/0140868 A1 | 5/2016 | Lovett et al. | |
| 2016/0176724 A1 | 6/2016 | Ji et al. | |
| 2016/0247324 A1 | 8/2016 | Mullins et al. | |
| 2017/0177807 A1 | 6/2017 | Fabian | |
| 2017/0308751 A1 | 10/2017 | Kim et al. | |
| 2017/0322536 A1* | 11/2017 | Pandiyath | G06Q 10/06 |
| 2018/0018141 A1 | 1/2018 | Wang et al. | |
| 2018/0259486 A1 | 9/2018 | Babcock, IV et al. | |
| 2019/0316912 A1 | 10/2019 | Maggiore et al. | |
| 2019/0321981 A1* | 10/2019 | Bosworth | B25J 9/04 |
| 2020/0167712 A1 | 5/2020 | Stracquatanio et al. | |

OTHER PUBLICATIONS

Notice of Allowanced received in U.S. Appl. No. 16/678,992 dated Dec. 2, 2021.

* cited by examiner

SYSTEM FOR REMOTE OPERATION OF NON-NETWORKED PRODUCTION EQUIPMENT UNITS

CROSS-REFERENCE TO RELATED APPLICATIONS

This Application claims the benefit of U.S. Provisional Application No. 63/140,122, filed on 21 Jan. 2021, which is incorporated in its entirety by this reference.

TECHNICAL FIELD

This invention relates generally to the field of robotics and more specifically to a new and useful system for remote operation of non-networked production equipment units in the field of robotics.

DESCRIPTION OF THE EMBODIMENTS

Figure 1:
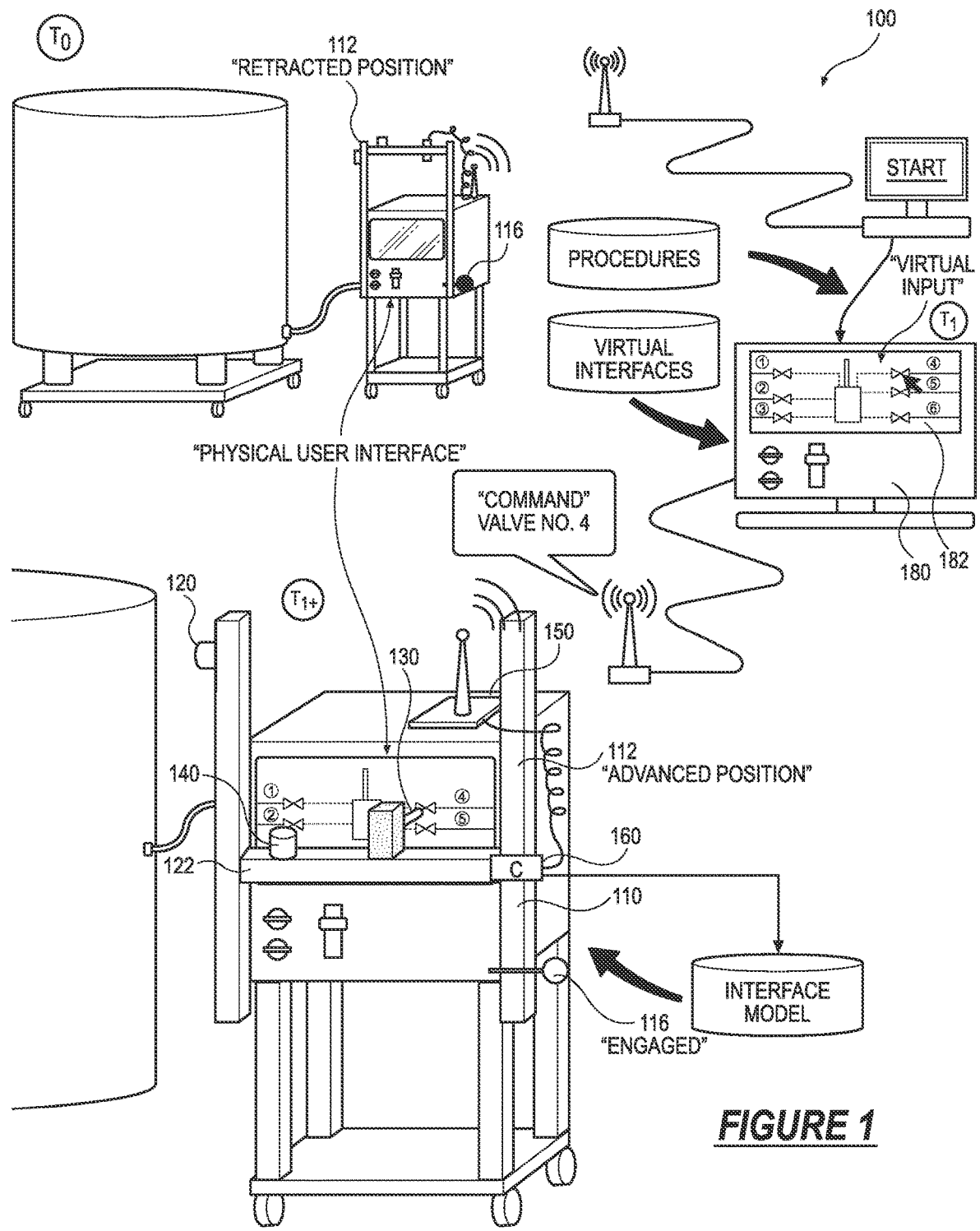
FIG. 1 is a flowchart representation of a system.
Figure 2:
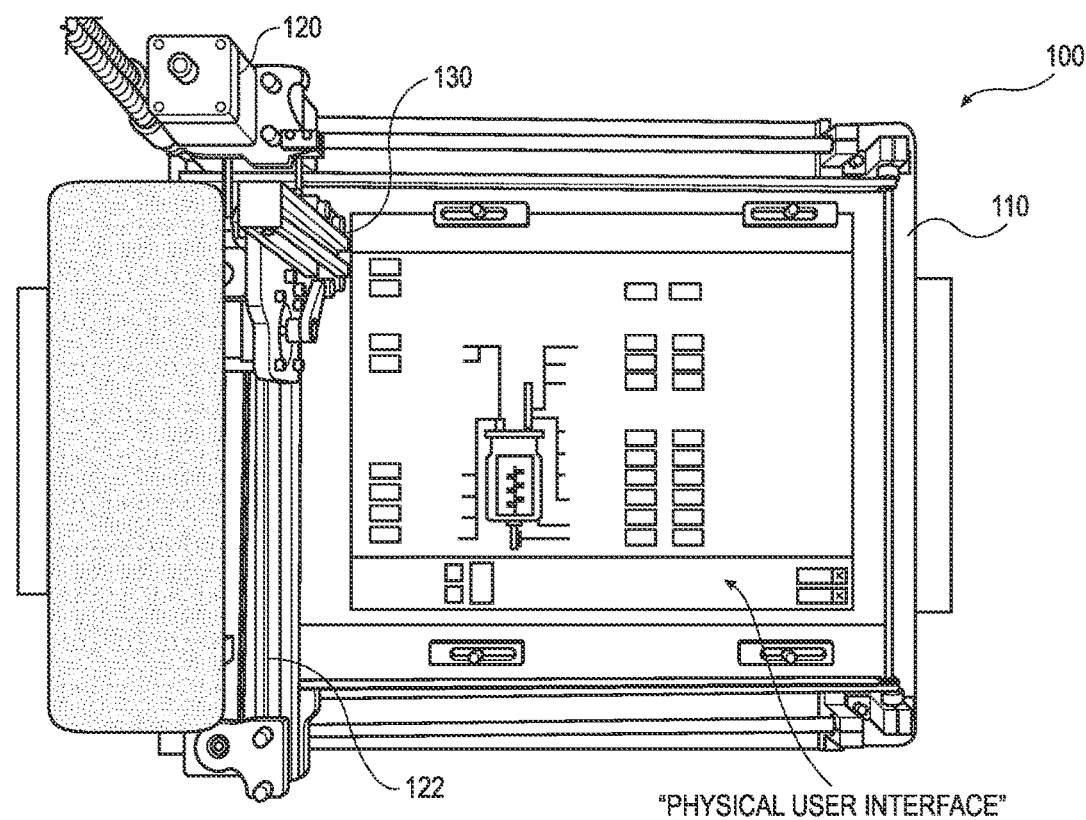
FIG. 2 is a schematic representation of one variation of the system.
Figure 3:
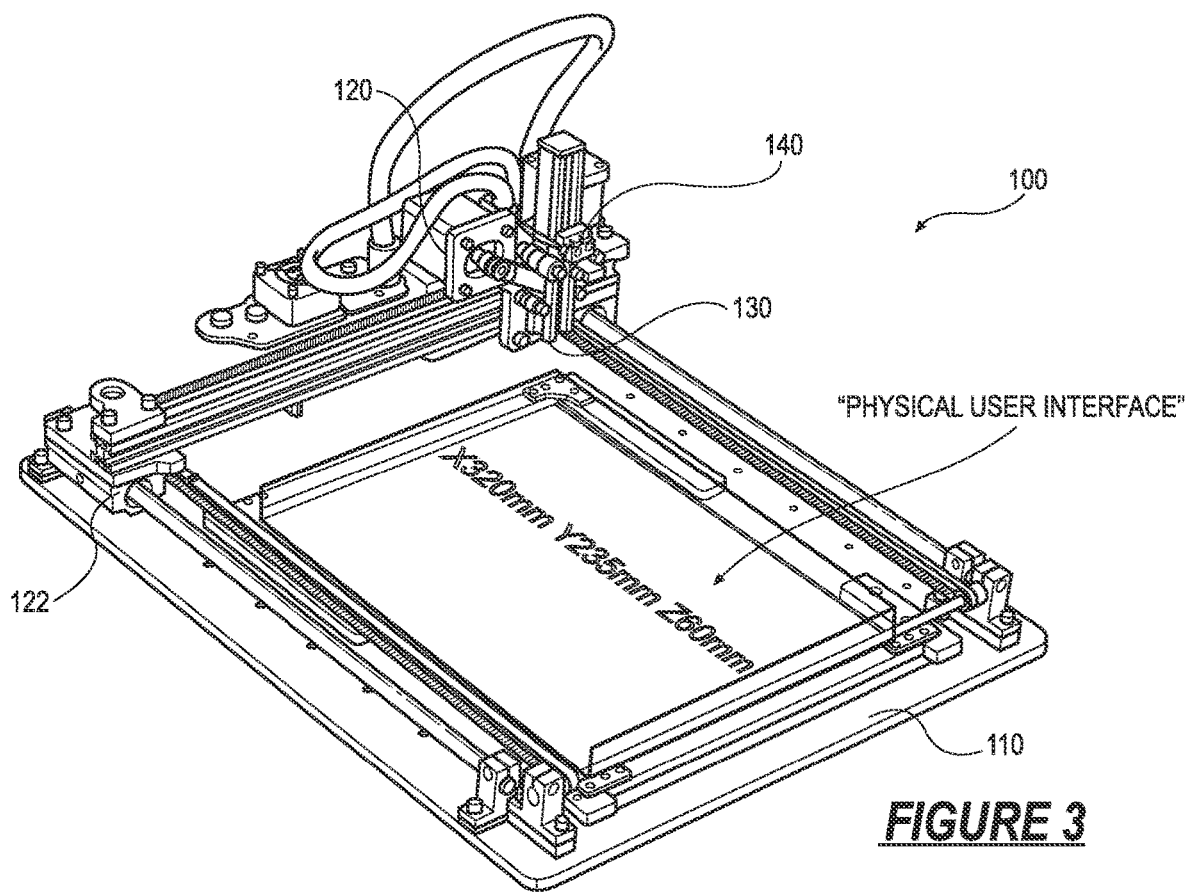
FIG. 3 is a schematic representation of one variation of the system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-5, a system 100 for remote operation of non-networked production equipment units includes: a chassis 110 configured to locate over a physical user interface of a production equipment unit, the physical user interface including a set of physical input fields; a set of actuators 120 coupled to the chassis 110; a selector 130 manipulated by the set of actuators 120 and configured to interface with the set of physical input fields; and a communication module 150 configured to receive a first command during a procedure at the production equipment unit, the first command corresponding to a first virtual input entered by a remote operator at a virtual user interface 182, the virtual user interface 182 representing the physical user interface and depicted within an operator portal 180 remote from the production equipment unit. The system 100 also includes a controller 160 configured to: interpret a first set of motions of the selector 130 based on the first command; and drive the set of actuators 120 according to the first set of motions to manipulate the selector 130 across a first physical input field, in the set of physical input fields, on the physical user interface and physically reproduce the first virtual input at the physical user interface of the production equipment unit.

One variation of the system 100 includes: a chassis 110 configured to transiently install over a physical user interface of a production equipment unit, the physical user interface including a set of physical input fields; a set of actuators 120 coupled to the chassis 110; a selector 130 manipulated by the set of actuators 120 and configured to interface with the set of physical input fields; and an optical sensor 140 arranged on the chassis 110, facing the physical user interface, and configured to capture an image feed depicting the physical user interface during a procedure at the production equipment unit. In this variation, the system 100 also includes a network communication module 150 configured to: broadcast the image feed for access by an operator portal 180; and receive a first command during the procedure, the first command corresponding to a first virtual input entered by a remote operator at a virtual user interface 182, the virtual user interface 182 representing the physical user interface and depicted within an operator portal 180 remote from the production equipment unit. In this variation, the system 100 further includes a controller 160 configured to: interpret a first set of motions of the selector 130 based on the first command; and drive the set of actuators 120 according to the first set of motions to manipulate the selector 130 across a first physical input field, in the set of physical input fields, on the physical user interface and physically reproduce the first virtual input at the physical user interface of the production equipment unit.

2. Applications

Generally, the system 100 can assimilate: virtual inputs entered by a remote operator working in a virtual operator portal 180 at a remote machine (e.g., a desktop computer, a tablet, a mixed-reality display); physical manipulation of a physical user interface in a non-networked production equipment unit, thereby enabling the remote operator to perform a procedure at a non-networked production equipment unit in a production facility while the remote operator works remotely from the production facility (e.g., "from home") or in an isolated room in the production facility away from the production equipment unit.

In particular, the system 100 can be temporarily or permanently installed or integrated over a user interface on a non-networked production equipment unit. The system 100 includes: a set of actuators 120; a selector 130; and a controller 160 configured to receive a command entered by a remote operator and to manipulate the selector 130 across the physical user interface—via the set of actuators 120—to physically enter the command into the physical user interface. For example, the remote operator may: access a virtual operator portal 180 executing on a computing device (e.g., a desktop computer, a tablet); view a virtual representation of a user interface on a production equipment unit within the operator portal 180; and enter virtual inputs into this virtual representation of the physical user interface to remotely perform a procedure at the production equipment unit. During this procedure, the operator portal 180 can log into the system 100 and return commands—specifying virtual inputs entered by the remote operator into the virtual representation of the physical user interface—to the system 100, such as via a computer network. The system 100 can then manipulate the set of actuators 120 to: depress the selector 130 onto a touchscreen (an "input field") to enter a command; drive the selector 130 across a toggle switch (an "input field") to change a state of the toggle switch; and drive the selector 130 in an arc over a rotary dial (an "input field") to change a position of the rotary dial based on these commands received from the remote operator via the operator portal 180.

The system 100 can therefore be (temporarily, transiently) installed on a non-networked (or "siloed") production equipment unit in a production facility (e.g., a pharmaceutical production facility) in order to enable a remote operator to remotely operate the production equipment unit and/or to enable concurrent operation of multiple production equipment units in different locations by the same local or remote operator. In particular, these production equipment units may exclude wireless communication functions and may not be connected to wired or wireless computer networks. While such configuration prevents hacking and otherwise reduces or eliminates security risk related to operation of these production equipment units, these production equipment units can require physical inputs to operate and perform procedures. Therefore, to enable a remote operator to operate a production equipment unit remotely, the system 100: can be temporarily installed on the production equipment unit during a procedure at the production equipment unit; can transform virtual inputs entered by the remote operator at an operator portal 180 into physical inputs into the production equipment unit; and can be physically removed from the production equipment unit upon completion of the procedure to prevent hacking and reduce security risk at the production equipment unit. Similarly, the system 100: can be permanently installed on or integrated into the production equipment unit; can be physically moved into an active position over an user interface by an onsite operator in preparation for a procedure at the production equipment unit; can transform virtual inputs entered by the remote operator at an operator portal 180 into physical inputs into the production equipment unit; and can be physically retracted from the physical user interface upon completion of the procedure to prevent hacking and reduce security risk at the production equipment unit.

3. Fixed Robotic System

Generally, the system 100 can be temporarily or permanently installed over or integrated into a user interface on a non-networked production equipment unit, as shown in FIGS. 2-5. In particular, the system 100 includes: a set of actuators 120; a selector 130; and a controller 160 configured to receive a command entered by a remote operator and to manipulate the selector 130 across the physical user interface—via the set of actuators 120—to physically enter the command into the physical user interface.

3.1 Chassis

Figure 4:
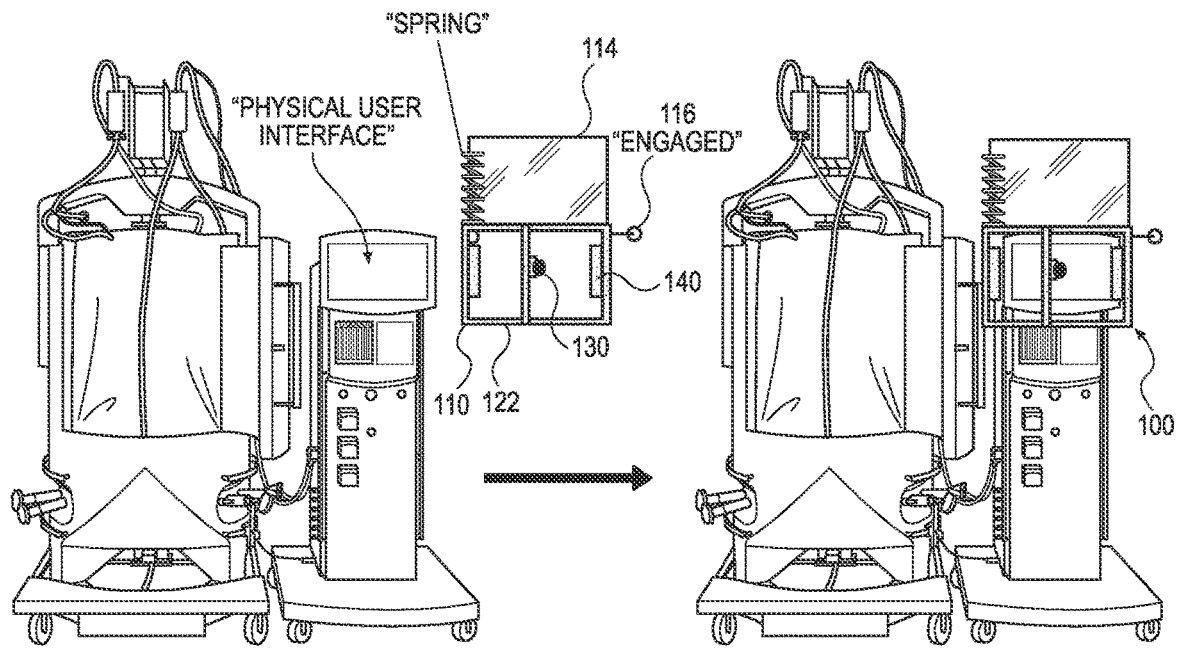
FIG. 4 is a flowchart representation of one variation of the system.

As shown in FIG. 4, the system 100 can include a chassis 110 configured to mount the system 100 to the production equipment unit.

In one implementation, the chassis 110 includes a perimeter frame configured to retrofit over a perimeter of a user interface on the production equipment unit, such as a touchscreen display or a control panel with multiple discrete displays, gauges, dials, physical switches, physical buttons, a physical keypad, and/or a physical keyboard. For example, the perimeter frame can define a fixed width and length sized for a common user interface size and geometry.

Alternatively, the perimeter frame can be adjustable to enable the system 100 to install on multiple user interfaces of different sizes and geometries. For example, the perimeter frame can include a set of telescoping vertical and/or lateral segments that can be adjusted to the size and geometry of a user interface when the system 100 is installed around this user interface.

However, the chassis 110 can define any other size or geometry.

3.2 Mounting

In one implementation, the system 100 includes a set of clamps (or other attachment mechanism) that extend rearward from the chassis 110, are configured to wrap behind the perimeter of the physical user interface, and include a cam or spring element that draws the chassis 110 against the perimeter of the physical user interface to (temporarily) fasten the chassis 110 to the physical user interface.

In another implementation, the system 100 includes: a set of flanges arranged on vertical and/or horizontal sections of the chassis 110; and a set of clips configured to slide along the flanges and to fasten the chassis 110 to the physical user interface. For example, an installer may remove existing fasteners from the front of the physical user interface, adjust the clips on the frame to align through-bores in the clips to threaded bores in the physical user interface, and replace the fasteners in these threaded bores to assemble the frame onto the physical user interface. In another example, the installer may fasten the chassis 110 to the physical user interface by inserting self-tapping screws through these clips and into the physical user interface.

In another implementation, the system 100 includes a flange and a return extending rearward from the top edge of the chassis 110 and configured to seat over a top of the physical user interface to carry the vertical load of the system 100 into the physical user interface. In this implementation, the system 100 can also include a clamp, a clip, a magnetic element, a suction cup, or elastic cord, etc. configured to couple to the physical user interface or to the production equipment unit more generally to further retain the chassis 110 against the physical user interface.

In yet another implementation, the system 100 includes a set of suction cups configured to mount the chassis 110 against smooth surfaces on the production equipment unit, such as a glass or polycarbonate touchscreen or a smooth bezel around a display or other user interface on the production equipment unit.

However, the system 100 can be configured to mount or fasten to the physical user interface in any other way.

Alternatively, in one variation, the chassis 110 is integrated into (e.g., constructed with, physically coextensive with) the physical user interface, such as during manufacture of the production equipment unit.

3.3 X- and Y-Axis Actuators

In one implementation, the system 100 includes an (x,y) gantry 122 arranged on the frame and configured to move the selector 130 horizontally (i.e., along an x-axis) and vertically (i.e., along a y-axis) across the physical user interface. In this implementation, the gantry 122 can include: a set of x-axis rails mounted to horizontal sections of the chassis 110; a bridge supported between the x-axis rails; a linear or rotary x-axis actuator 120 (e.g., a servo, a stepper motor) that drives the bridge along the x-axis rails to position the bridge over a range of x-axis positions on the chassis 110; a set of y-axis rails mounted to the bridge; a carriage supported on the y-axis rails; and a linear or rotary y-axis actuator 120 drives the carriage along the y-axis rails to position the carriage over a range of y-axis positions along the bridge.

However, the system 100 can include another type or format of (x,y) position system.

3.4 Selector and Z-Axis Actuator

The system 100 also includes: a selector 130 configured to interface with input fields on the physical user interface; and a z-axis actuator 120 (or "depth actuator 120") mounted to the carriage described above and configured to extend and retract the selector 130 to selectively engage input fields on the physical user interface.

For example, the system 100 can include a gantry 122: configured to run on the chassis 110 over a range of longitudinal positions greater than a height of the physical user interface; and supporting the selector 130 over a range of lateral positions and over a range of vertical positions on the chassis 110, the range of lateral positions greater than a width of the physical user interface. In this example, the set of actuators 120 can include: a first actuator 120 configured to drive the gantry 122 over the range of longitudinal positions; a second actuator 120 configured to drive the gantry 122 over the range of lateral positions; and a third actuator 120 configured to drive the gantry 122 over the range of vertical positions.

The system 100 can also include a force sensor (e.g., a strain gauge) integrated into or coupled to the selector 130 and configured to output a signal representative of a force applied by the selector 130 to the physical user interface. (Alternatively, the controller 160 can monitor current draw of x-, y-, and/or z-axis actuators 120 and interpret force applied by the selector 130 to the physical user interface based on these currents.)

In one implementation, the selector 130 includes a silicone rubber depressor; and the z-axis actuator 120 includes a solenoid configured to move the rubber button along a z-axis of the system 100 (i.e., perpendicular to the x- and y-axes; normal to the physical user interface) between an extended position and a retracted position to depress and release a mechanical button on a control panel or a virtual button on a touchscreen (e.g., a capacitive touch screen) of the physical user interface.

In another implementation, the z-axis actuator 120 includes a rotary servo; and the selector 130 includes a servo arm mounted to the servo and a silicone rubber depressor mounted to a distal end of the servo arm. In this implementation, to select a mechanical button on a control panel or a virtual button on a touchscreen of the physical user interface, the controller 160 can: drive the rotary servo to a 0° home position that locates the distal end of the servo arm retracted from the physical user interface; drive the x- and y-axis actuators 120 to an (x,y) position that locates the selector 130 over the button; and drive the rotary servo forward (e.g., to a depress position of 70°) to engage the depressor against the button. (Alternatively, the controller 160 can cease actuation of the rotary servo: when current draw of servo increases, which may indicate that the toggle switch has reached a stop; or when a force detected by the force sensor in the selector 130 rises with minimal change in the position of the rotary servo, which may indicate that the button has reached a stop.) The controller 160 can then reverse the rotary servo to disengage the depressor from the button to complete the input.

In this implementation, to select a mechanical toggle switch on the physical user interface, the controller 160 can: drive the rotary servo to a 0° home position that locates the distal end of the servo arm retracted from the physical user interface; drive the x- and y-axis actuators 120 to an (x,y) position that locates the selector 130 below the mechanical toggle switch; drive the rotary servo forward to a toggle engage position (e.g., 45°); drive the y-axis actuator 120 to raise the selector 130 toward the mechanical toggle switch; track current draw of the rotary servo to hold the toggle engage position and/or current draw of the y-axis actuator 120 to raise the selector 130; and detect the selector 130 overcoming a yield force of the toggle switch—and thus the toggle switch transitioning into a different position—in response to a momentary drop in the current draw of the rotary servo and/or the y-axis actuator 120. (Alternatively, the controller 160 can cease actuation of the y-axis actuator 120: when the current draw of the rotary servo and/or the y-axis actuator 120 increases, which can indicate that the toggle switch has reached a stop; or when a force detected by the force sensor in the selector 130 rises within minimal change in position of the y-axis actuator 120, which can indicate that the toggle switch has reached a stop.) The controller 160 computer network can then reverse the y-actuator 120 to release the selector 130 from the toggle switch and return the rotary servo to the home position to complete this input.

In this implementation, to move a mechanical slider on the physical user interface, the controller 160 can: drive the rotary servo to a 0° home position that locates the distal end of the servo arm retracted from the physical user interface; drive the x- and y-axis actuators 120 to an (x,y) position that locates the selector 130 below the lowest position of the mechanical slider; drive the rotary servo forward to a slider engage position (e.g., 45°); drive the y-axis actuator 120 to raise the selector 130 toward the bottom of the mechanical slider; continue driving the y-axis actuator 120 to raise the selector 130 to a vertical location corresponding to a new target position of the mechanical slider; and then reverse the y-actuator 120 to release the selector 130 from the toggle switch and return the rotary servo to the home position to complete this input.

In another implementation, the z-axis actuator 120 includes a linear actuator 120. In this implementation, the controller 160 can implement similar methods and techniques to interface the selector 130 to mechanical and virtual input fields on the physical user interface.

In one variation, the system 100 further includes a fourth-axis rotary actuator 120 coupled to the z-axis actuator 120 and configured to rotate the selector 130 about the z-axis of the system 100. In this variation, the computer system can include a forked selector 130 configured to interface with panel-mounted lever switches. In particular, to manipulate a panel-mounted lever switch, the controller 160 can engage the forked selector 130 against flats on the panel-mounted lever switch and then trigger the fourth-axis rotary actuator 120 to rotate the forked selector 130, thereby rotating the panel-mounted lever switch to a new position. In this implementation, the controller 160 can also: track a current draw of the fourth-axis rotary actuator 120; and cease actuation of the fourth-axis rotary actuator 120 when this current draw momentarily drops, which can indicate that the lever switch broke over to a next position; or cease actuation of the fourth-axis rotary actuator 120 when this current draw increases, which can indicate that the lever switch has reached a stop.

In yet another implementation, the system 100 includes a hollow flexible selector 130 configured to set over rotary and knob switches. For example, the selector 130 can include a rubber barrel with a tapered internal bore. In this example, to rotate a rotary switch on the physical user interface between angular positions, the controller 160 can: retract the z-axis actuator 120 to a 0° home position that offsets the distal end of the selector 130 from the physical user interface; drive the x- and y-axis actuators 120 to an (x,y) position that locates the selector 130 coaxial with the rotary switch; and drive the z-axis actuator 120 forward to engage the tapered bore of the selector 130 over the rotary switch. The controller 160 can then cease actuation of the z-axis actuator 120 when a current draw of the z-axis actuator 120 increases or when a force detected by the force sensor in the selector 130 rises with minimal change in position of the z-axis actuator 120, which may indicate that the rotary switch has bottomed within the selector 130. The controller 160 can then drive the fourth-axis rotary actuator 120 to rotate the selector 130—and thus the rotary switch—by a target change in angular position of the rotary switch. The controller 160 can then reverse the z-axis actuator 120 to release the selector 130 from the rotary switch.

However, the system 100 can include any arrangement and type(s) of actuators 120 and can include a selector 130 of any other geometry, as shown in FIGS. 8A, 8B, 8C, and 8D. The controller 160 can also execute any other lead-in, input field actuation, and lead-out trajectories to manipulate the foregoing and/or other input field types.

3.5 Selector Changer

In one variation, the system 100 further includes: multiple different selectors 130 configured to engage input fields of different types, sizes, and/or geometries on the physical user interface; and a selector tray configured to store these selectors 130. In this variation, upon receipt of a command from the remote operator, the controller 160 can: identify a particular selector type for a particular input field specified in this command; execute a tool change operation to return a selector 130 currently located on the z-axis actuator 120 to a storage location in the selector tray and to attach a second selector 130 of the particular selector type to the z-axis actuator 120; and then execute lead-in, input field actuation, and lead-out trajectories to manipulate this input field—with the particular selector 130—according to the command.

In a similar variation, the system 100 includes: a multi-position selector 130 that includes multiple selector surfaces defining different geometries and configured to engage inputs of different types, sizes, and/or geometries on the physical user interface; and a selector actuator 120 coupled to the multi-position selector 130 to the z-axis actuator 120 and configured to reposition (e.g., rotates) the multi-position selector 130 to position a particular selector surface to engage the physical user interface. In this variation, upon receipt of a command from the remote operator, the controller 160 can: identify a particular selector type for a particular input field specified in this command; drive the selector actuator 120 to position a particular selector surface—of the particular selector type—to face the physical user interface; and then execute lead-in, input field actuation, and lead-out trajectories to manipulate this input field—with the particular selector 130—according to the command.

3.6 Multiple Selectors

Figure 8A:
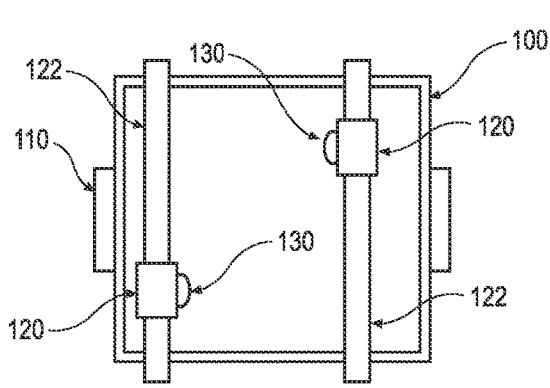
FIGS. 8A-8F are schematic representations of variations of the system.

In one variation shown in FIG. 8A, the system 100 includes multiple sets of actuators 120 and selectors 130, such as: two gantries and two sets of actuators 120 supporting two independently-operable selectors 130; or a gantry 122 and a set of actuators 120 supporting a first selector 130 and a secondary robotic arm supporting a second selector 130. Accordingly, in this variation, the system 100 can execute methods and techniques described herein to control a physical user interface that includes a multitouch digital display.

3.7 User Interface Imager

The system 100 can also include an optical sensor 140 (e.g., a color camera) configured to capture images of the physical user interface, and the communication module 150 can return these images (or processed variants of these images) to the operator portal 180 in (near) real-time, thereby enabling the remote operator to view the physical user interface, states of inputs on the physical user interface, and statuses of the production equipment unit during remote execution of the procedure at the production equipment unit. In particular, the system 100 can include an optical sensor 140: arranged on the chassis 110; facing the physical user interface; and configured to capture an image feed depicting the physical user interface, such as including a first image depicting the physical user interface at a first time, a second image depicting the physical user interface at a second time, etc.

In one implementation, the computer system includes a set of optical sensors 140 arranged on the corners of the chassis 110 and facing inwardly toward a center of the chassis 110. When the system 100 is installed over a user interface, the physical user interface can thus fall within the fields of view of these optical sensors 140. During operation, the controller 160 can: capture a set of concurrent images from the set of optical sensors 140; stitch these concurrent images into one composite 2D image—projected onto a plane of the physical user interface—based on known positions and orientations of the optical sensors 140 on the system 100; and return this composite 2D image to the operator portal 180, which then renders this composite 2D image for the remote operator.

Figure 6:
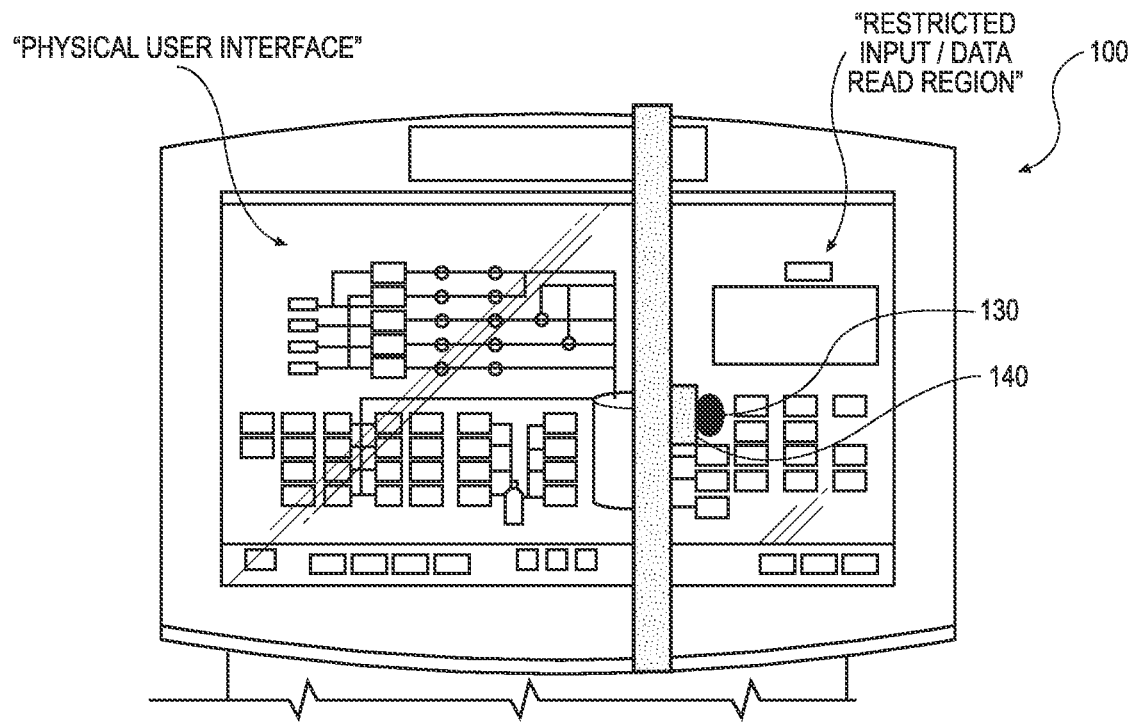
FIG. 6 is a schematic representation of one variation of the system.

In another implementation shown in FIG. 6, the system 100 includes an optical sensor 140 located on the gantry 122. During operation, the controller 160 can: scan (e.g., raster) the optical sensor 140 across the physical user interface; capture images of the physical user interface via the optical sensor 140; assemble a sequence of images captured by the optical sensor 140 into one composite 2D image of the physical user interface; and return this composite 2D image to the operator portal 180, which then renders this composite 2D image for the remote operator.

In yet another implementation, the system 100 further includes: a boom extending outwardly from the chassis 110; and an optical sensor 140 mounted on the boom and facing inwardly toward the center of the chassis 110. During operation, the controller 160 can: capture a video feed of the physical user interface via the optical sensor 140; and return this video feed to the operator portal 180, which then renders this video feed for the remote operator.

Alternatively, the system 100 (or a remote computer system) can implement methods and techniques described in U.S. patent application Ser. No. 16/700,851 to extract states of displays, gauges, dials, etc. from an image of the physical user interface and return these states to the operator portal 180. The operator portal 180 can then update virtual representations of these displays, gauges, dials, etc.—within a virtual representation of the physical user interface—according to their states, thereby enabling the remote operator to directly track these displays, gauges, dials, etc. and enter virtual inputs via this virtual representation of the physical user interface. For example, the system 100 and the operator portal 180 can execute this process to update a virtual representation of a display, gauge, or dial, etc. at the physical user interface within 200 milliseconds of refresh of the display, gauge, or dial, etc. at the physical user interface.

3.8 Controls

As shown in FIG. 1, the system 100 also includes a wireless communication module 150 configured: to return user interface images to a computer network, which distributes these user interface images to a operator portal 180 accessed by the remote operator; and to receive commands entered by the remote operator at the operator portal 180. The system 100 can also include an integrated battery and/or a power supply configured to draw electrical power from the production equipment unit or a nearby power outlet.

The system 100 further includes the controller 160 configured: to interpret a sequence of lead-in, input field actuation, and lead-out trajectories of the selector 130 based on the command; and to drive the x-, y-, and z-axis actuators 120, etc. to sweep the selector 130 across these lead-in, input field actuation, and lead-out trajectories, thereby interfacing the selector 130 to a particular input field on the physical user interface according to the command.

4. System Location for Remote Control

In one implementation shown in FIG. 1, to enable a remote operator to perform a procedure at a production equipment unit via the system 100, an onsite operator may: temporarily install the system 100 over a user interface of a production equipment unit; connect the system 100 to a power outlet and/or or engage a power switch on the system 100 to draw electrical power from an onboard battery; and/or remove a physical lock on the chassis 110 (e.g., on the gantry 122, on the robotic arm), thereby enabling the system 100 to physically manipulate the selector 130 across the physical user interface.

In one example, the chassis 110 is configured to: transiently mount to the physical user interface of the production equipment unit during a first time period; and transiently mount to a second physical user interface of a second production equipment unit during a second time period. In particular, an onsite operator can move the system 100 between production equipment units, such as based on a schedule of procedures assigned to production equipment units throughout the facility. Accordingly, in this example, the communication module 150 can execute methods and techniques described herein to receive a first series of commands during the procedure at the production equipment unit during the first time period; and the controller 160 can drive the set of actuators 120 according to a first set of motions to physically reproduce a first series of virtual inputs—defined in the first series of commands—at the physical user interface of the production equipment unit during the first time period.

Similarly, in this example, the communication module 150 can receive a second series of commands during a second procedure at the second production equipment unit during the second time period, wherein the second series of commands corresponds to a second series of virtual inputs entered by a second remote operator at a second virtual user interface 182, and wherein the second virtual user interface 182 represents the second physical user interface and is depicted within a second operator portal 180 remote from the second production equipment unit. The controller 160 can then: interpret a second set of motions of the selector 130 based on the second series of commands; and drive the set of actuators 120 according to the second set of motions to physically reproduce the second series of virtual inputs—defined in the second series of commands—at the second physical user interface of the second production equipment unit during the second time period.

4.1 Retractable Chassis

Figure 5:
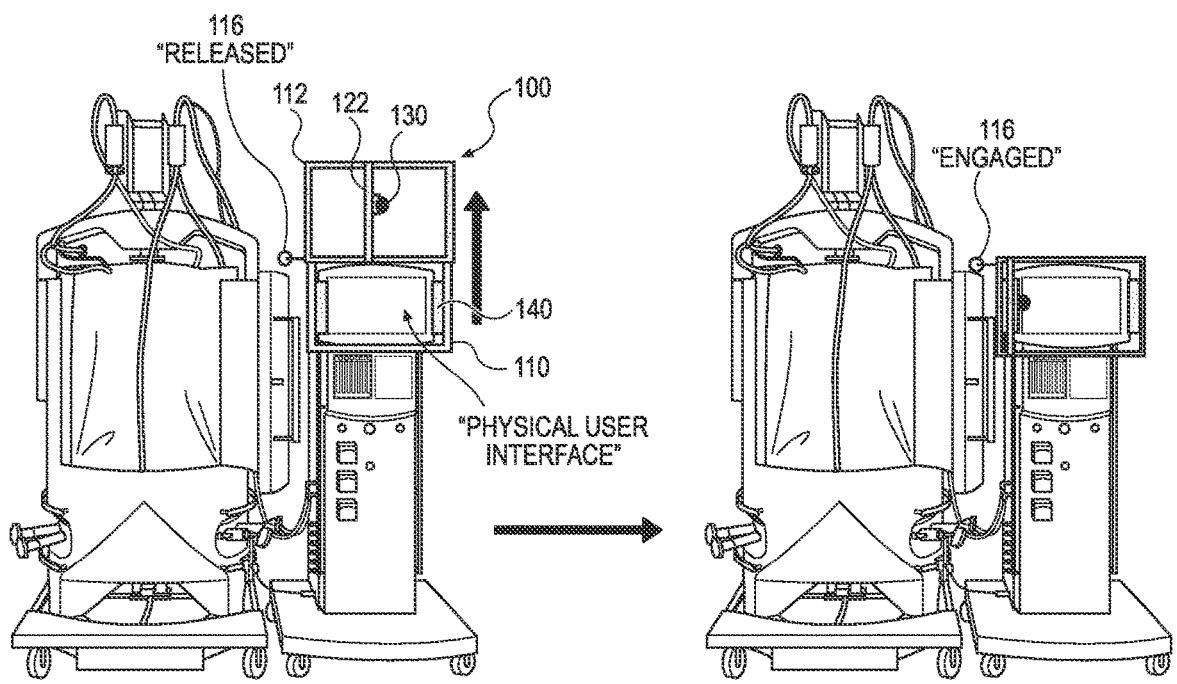
FIG. 5 is a flowchart representation of one variation of the system.

In one variation shown in FIG. 5, the chassis 110 includes: a fixed chassis 110 component configured to fixedly mount to a production equipment unit and including a set of rails; and a retractable chassis 110 component configured to slide along the set of rails between a) an active position in which the retractable chassis 110 component locates the gantry 122 over the physical user interface to enable the selector 130 to access the physical user interface and b) a secured position in which the retractable chassis 110 component retracts the gantry 122 from the physical user interface to prevent the selector 130 from accessing the physical user interface. (However, the retractable chassis 110 component can pivot, rotate, or otherwise retract from the active position to the secured position in any other way.)

In this variation, the system 100 can also include: a spring element configured to draw the retractable chassis 110 component (or "rack") from the active position into the secured position; a latch 116 configured to retain the retractable chassis 110 component in the active position; and a latch actuator controlled by the controller 160 and configured to release the latch 116 to enable the spring element to draw the retractable chassis 110 component into the secured position. In one implementation, the system 100 includes a rack 112 supporting the set of actuators 120 on the chassis 110 and operable in: an active (or "advanced") position to locate the selector 130 over the physical user interface; and a secured (or "retracted") position to physically isolate the selector 130 from the physical user interface. In this example, the system 100 can also include a latch 116 configured to retain the rack 112 in the advanced position, such as responsive to manual advancement of the rack 112 from the secured position to the active position. For example, the latch 116 can include a fail-safe electromagnetic lock that automatically unlocks and releases the rack 112 to the secured position in response to loss of power or interrupted communication from the controller 160.

In this variation, an onsite operator may manually pull the retractable chassis 110 component into the active position in preparation for a procedure at the production equipment unit. A remote operator may then log in to the operator portal 180, access remote control of the system 100 via the operator portal 180, and remotely perform the procedure at the production equipment unit via the operator portal 180 and the system 100. The controller 160 can then trigger the latch 116 to release the rack 112 to the secured (or "retracted") position in response to conclusion of the procedure at the production equipment unit. For example, when the remote operator completes the procedure, the remote operator may select—at the operator portal 180—a command to disable the system 100, or the operator portal 180 can automatically generate a command to disable the system 100 upon completion of the procedure. Upon receipt of this command, the controller 160 can trigger the latch actuator to release the latch 116, thereby enabling the spring element to draw the retractable chassis 110 component back into the secured position.

Because the system 100 excludes an actuator 120 to draw the retractable chassis 110 component into the active position, this action prevents the system 100 from entering further inputs into the production equipment unit until an onsite operator manually moves the retractable chassis 110 component back to the active position, thereby physically securing the system 100 and the production equipment unit against network intrusion.

Furthermore, the system 100 can remain intransiently (e.g., permanently) attached to the physical user interface, but the retractable chassis 110 component can enable the onsite operator to separate the gantry 122 from the physical user interface by releasing the latch 116, thereby enabling the onsite operator to view and operate the production equipment unit locally.

4.2 Security Controls

Figure 9A:
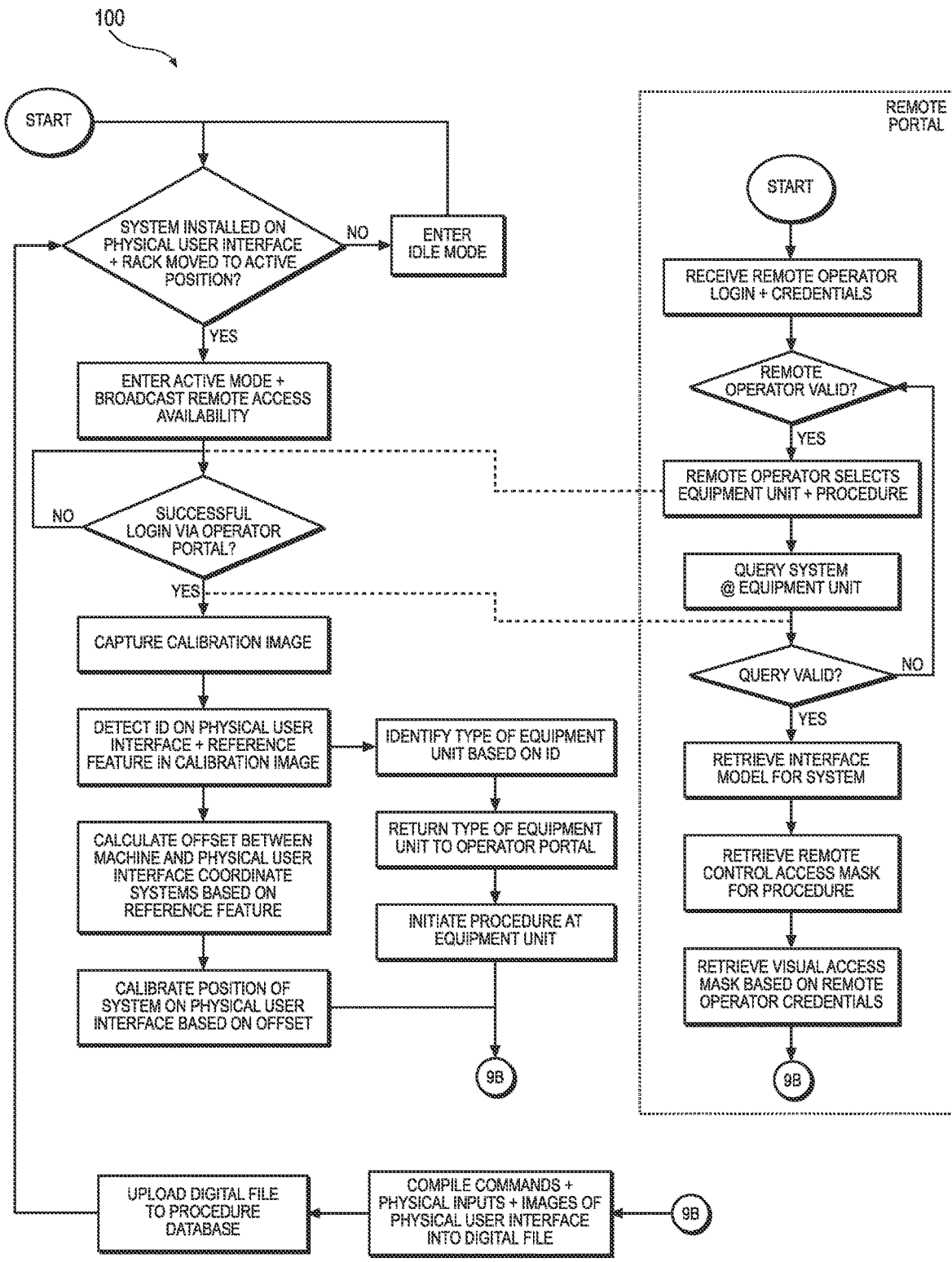
FIGS. 9A and 9B are a flowchart representation of one variation of the system.
Figure 9B:
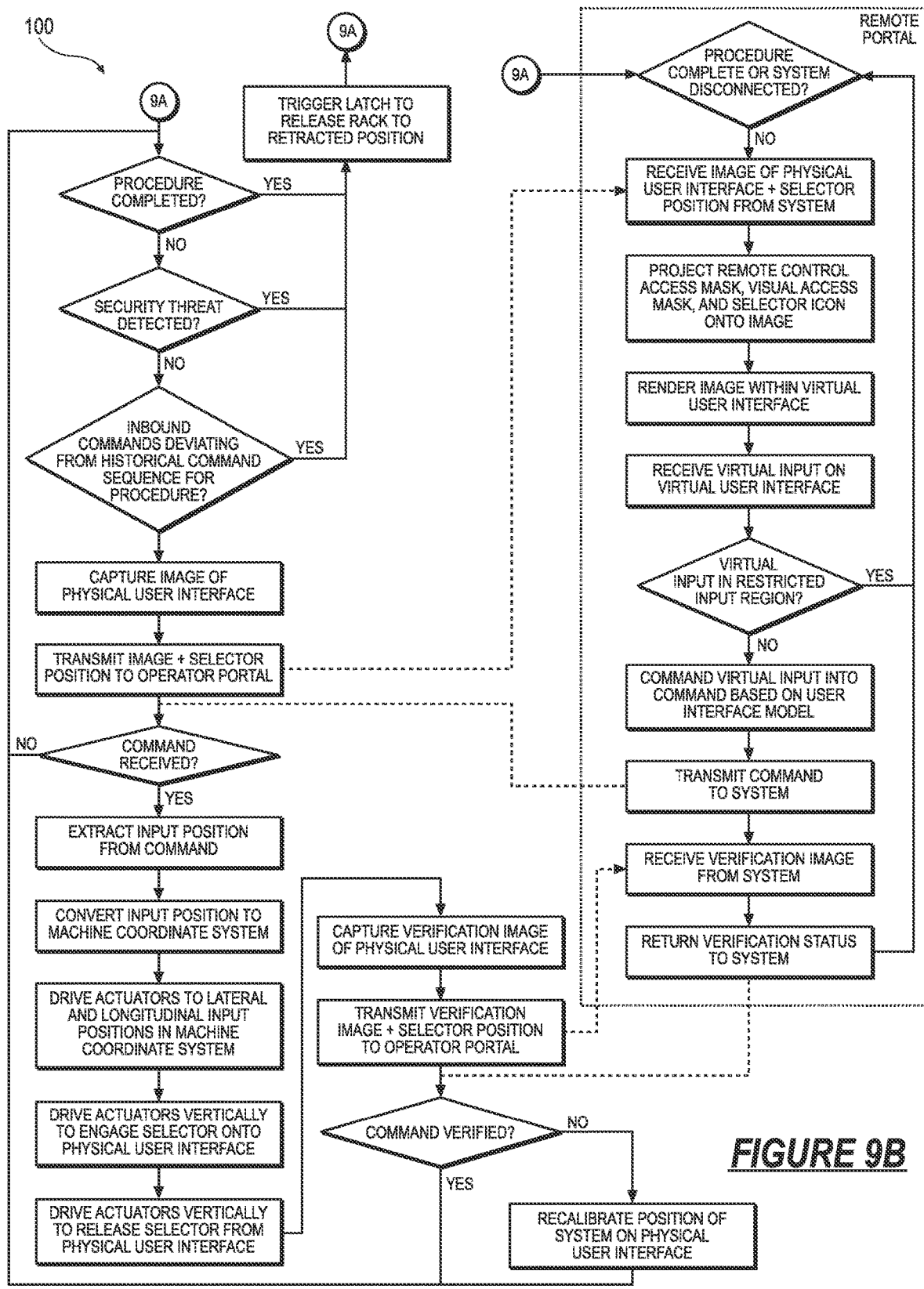

In the foregoing variation and as shown in FIG. 9B, the controller 160 can be further configured to trigger the latch 116 to release the rack 112 from the active position to the secured position in response to detection of one of: a security threat to the system 100; a security attack on the operator portal 180; a sequence of commands, received from the operator portal 180, that differ from historical sequences of actions associated with the procedure; loss or interruption of network connectivity via the communication module 150; and/or login by a remote operator, at the operator portal 180, excluded from access to the production equipment unit via the virtual user interface 182.

For example, in this variation, the controller 160 can: directly implement security protocols to detect security threats to the system 100; trigger the latch 116 to release in response to detecting a possible security threat, thereby releasing the rack 112 to the secured position without means to automatically return the rack 112 to the active position; and output an alarm or prompt to an onsite operator to manually return the rack 112 to the active position only after verifying security of the system 100.

Additionally or alternatively, the computer network, remote computer system, and/or operator portal 180 can implement security protocols to detect security threats to the system 100 and transmit an alarm to the controller 160 in response to detecting a security threat. In this example, the controller 160 can: trigger the latch 116 to release in response to receipt of the alarm, thereby releasing the rack 112 to the secured position without means to automatically return the rack 112 to the active position; and output an alarm or prompt to an onsite operator to manually return the rack 112 to the active position only after verifying security of the system 100.

In this example, the controller 160, the computer network, the remote computer system, and/or the operator can implement methods and techniques described in U.S. patent application Ser. No. 16/386,178, filed on 16 Apr. 2019 and which is incorporated in its entirety by this reference, to: access historical instances of the procedure currently in process at the production equipment unit; track a sequence of virtual inputs entered by the remote operator at the virtual user interface 182 during the current instance of the procedure; characterize a difference between these historical and current instances of the procedure; and flag the current instance of the procedure as suspicious if this difference exceeds a threshold amplitude or threshold rate over time (e.g., misordered steps of the procedure, inputs outside of historical ranges). Accordingly, the controller 160 can: trigger the latch 116 to release responsive to this flag, thereby releasing the rack 112 to the secured position without means to automatically return the rack 112 to the active position; and output an alarm or prompt to an onsite operator to manually return the rack 112 to the active position only after verifying the current instance of the procedure.

4.3 Retractable Shield

In a similar variation, the system 100 includes an interface shield 114: mounted to the chassis 110; transparent to light in a visible spectrum; and operable in 1) an advanced position to locate over the physical user interface to isolate the physical user interface from input by the selector 130 and 2) a retracted position to enable the selector 130 to access the physical user interface. In this variation, the system 100 can also include a latch 116 configured to retain the interface shield 114 in the retracted position, such as described above. Accordingly, the controller 160 is configured to trigger the latch 116 to release the rack 112 to the advanced position in response to conclusion of the procedure at the production equipment unit.

For example, in this implementation, the interface shield 114 can include a transparent (e.g., polycarbonate) panel configured to insert between the physical user interface and the chassis 110 in the advanced position, thereby: preventing contact between the selector 130 and the physical user interface and preventing the system 100 from physically reproducing virtual inputs at the physical user interface; while concurrently enabling an onsite operator to view the physical user interface without manipulating or moving the system 100 directly. However, when a procedure is scheduled at the production equipment unit and/or once the onsite operator confirms a procedure at the production equipment unit, the onsite operator can manually retract the interface shield 114—away from the physical user interface—to engage the latch 116, thereby enabling the system 100 to manipulate the physical user interface directly via the selector 130. Upon conclusion of the procedure, detection of a security threat, or loss of power, etc. the latch 116 can release the interface shield 114, thereby shielding the physical user interface from the selector 130 and preventing the system 100 from entering further physical inputs into the physical user interface.

5. User Interface Identification

In one implementation, the system 100 further includes a display and a control panel (e.g., numerical or alphanumerical control panel). When installing the system 100 on a user interface at a production equipment unit, the onsite operator may read a code on or adjacent the physical user interface and enter this code into the control panel on the system 100 to manually identify the physical user interface for the system 100. In this implementation, the system 100 can also interface with the onsite operator via the display to confirm the identity of the remote operator (e.g., via video telepresence), request and receive confirmation of the remote operator's identity, and/or confirm remote access to the production equipment unit for performance of the procedure via the system 100.

In another implementation, the system 100 further includes or connects to a scanner (e.g., a barcode scanner). In this implementation, the onsite operator may: install the system 100 over the physical user interface on a production equipment unit; and scan an identifier (e.g., a barcode) on or adjacent the physical user interface with the scanner. The scanner may return this identifier to the controller 160, which identifies the physical user interface accordingly.

In yet another implementation, the system 100 implements computer vision to automatically read an identifier of the physical user interface from an image captured by the optical sensor 140 in the system 100 following installation of the system 100 over the physical user interface.

In another implementation, the system 100 includes an RFID reader configured to read an identifier from a RFID tag in the production equipment unit. In this implementation, the system 100 can thus identify the physical user interface based on a RFID value received from the RFID tag in the production equipment unit following installation of the system 100 over the physical user interface.

However, the remote operator or the system 100 can implement any other method or technique to identify the physical user interface following installation of the system 100 over the physical user interface.

6. Interface Model

Once the system 100, the onsite operator, or the remote operator identifies the physical user interface coupled to the system 100, the system 100 can retrieve an interface model for the physical user interface specifically or for a type of the physical user interface, such as from a database of pre-defined interface models for user interfaces and/or user interface types on production equipment units in the production facility, as shown in FIGS. 1 and 9A.

For example, an interface model can define: a set of stored commands enabled for this particular user interface or user interface type; and a sequence of lead-in, input field actuation, and lead-out trajectories for each command in this set. In this example, a sequence of lead-in, input field actuation, and lead-out trajectories for a particular command can: define three-dimensional (e.g., (x,y,z)) waypoints, directions, and feed rates executable by the system 100 to manipulate a particular input field on the physical user interface—via the selector 130—according to a virtual input at the virtual representation of the physical user interface rendered at the operator portal 180; and force limits at the selector 130 and/or torque limits at the x-, y-, and/or z-axis actuators 120 to trigger transition between these waypoints and/or to verify manipulation of the input field according to the virtual input.

6.1 Coordinate System and Calibration

Furthermore, each sequence of lead-in, input field actuation, and lead-out trajectories for a particular command can be defined within a physical user interface coordinate system aligned to a feature (e.g., an "origin") on the physical user interface. Thus, once the system 100 is installed over the physical user interface, the system 100 can: capture a calibration image of the physical user interface; detect this feature; and derive an offset between a machine coordinate system of the system 100 and the physical user interface coordinate system based on a position of this feature in the calibration image. The system 100 can then execute lead-in, input field actuation, and lead-out trajectories—associated with commands received from the operator portal 180—within this machine coordinate system.

In one implementation shown in FIG. 9A, the optical sensor 140—arranged on the chassis 110 and facing the physical user interface—can capture a calibration image of the physical user interface once the system 100 is located on the physical user interface and activated, such as in preparation for the remote control of the procedure at the production equipment unit. The controller 160 can then: implement computer vision techniques to detect a constellation of features in the calibration image; and register a coordinate system of the system 100 relative to the constellation of features. Later, the controller 160 can: receive a command from the virtual user interface 182; convert a virtual two-dimensional position of a virtual input at the virtual user interface 182—stored in the command—into a longitudinal position and a lateral position within the coordinate system of the system 100; and then navigate the selector 130 to this longitudinal and lateral position and drive the selector 130 toward the physical user interface (e.g., according to generic lead-in, input field actuation, and lead-out trajectories or lead-in, input field actuation, and lead-out trajectories specific to this command) to execute the command at the production equipment unit.

For example, the controller 160 can scan: the calibration image for peripheral edges of the physical user interface and/or a barcode located or rendered on the physical user interface; locate a physical user interface origin at the intersection of the bottom-horizontal and left-vertical edges of the physical user interface detected in the calibration image; and calculate a yaw rotation value of the system 100 on the physical user interface based on angular positions of the peripheral edges of the physical user interface in the calibration image. The controller 160 can then calculate a linear and angular offset between a machine coordinate system of the system 100 and the physical user interface based on: the position of the physical user interface origin detected in the calibration image; the yaw rotation value derived from the calibration image; and a known position of the optical sensor 140 on the system 100. The computer system can then convert locations of inputs on the virtual user interface 182—prescribed by commands received from the virtual user interface 182 during the procedure—into machine coordinates based on this linear and angular offset.

Alternatively, upon remotely accessing the system 100 via the operator portal 180, the remote operator may review an image received from the system 100 and manually align the machine coordinate system of the system 100 to the user interface based on features depicted in the calibration image.

7. Remote Procedure Initialization

Later, a remote operator may log in to the operator portal 180 and select a procedure and/or select a production equipment unit within the operator portal 180, such as from a calendar of scheduled procedures within the production facility or from a dropdown menu of production equipment units. However, the remote operator may manually select a procedure and/or the production equipment unit in any other way, or a scheduler can push the procedure—with a specification for the production equipment unit—to the remote operator via the operator portal 180.

The operator portal 180 can then: retrieve a virtual representation of the physical user interface on the production equipment unit, such as including: virtual representations of a set of digital displays, analog gauges, dials, etc. with virtual states linked to physical states of these physical digital displays, analog gauges, dials, etc. on the physical user interface; and virtual representations of a set of input fields (e.g., virtual switches, virtual sliders, virtual dials) linked to commands—defined in the interface model for this user interface—executable by the system 100 to manipulate the corresponding physical input fields on the physical user interface.

For example, the virtual representation of the physical user interface can depict virtual displays and/or virtual input fields in locations, formats, geometries, and colors, etc. that mimic the locations, formats, geometries, and colors, etc. of the physical displays and physical input fields on the physical user interface. Each virtual input field is thus linked to a command—interpretable by the system 100 to manipulate the corresponding physical input field on the physical user interface—when the virtual input field is selected and modified within the operator portal 180 by the remote operator. Throughout a procedure, the physical user interface can also update the state or position of a virtual input field based on a last state or position of the corresponding physical input field manipulated by the system 100. Similarly, each virtual display in the virtual representation of the physical user interface can be linked to a physical display on the physical user interface. Throughout the procedure, the physical user interface can update the state of or data depicted on each virtual display based on data read from a section of an image—captured by the system 100—depicting this corresponding physical display on the physical user interface.

Alternatively, in one variation, the operator portal 180 can present a modified virtual representation of the physical user interface that depicts virtual displays and virtual input fields in locations, formats, geometries, and/or colors, etc. that differ from the locations, formats, geometries, and/or colors, etc. of the corresponding physical displays and physical input fields on the physical user interface, respectively. For example, the remote operator may customize the virtual representation of the physical user interface on a production equipment unit for more intuitive or more efficient remote operation of the production equipment unit. Additionally or alternatively, the operator portal 180 can automatically mute a subset of virtual displays and/or virtual input fields in the virtual representation of the physical user interface—corresponding to lower-priority or extraneous displays and/or input fields on the physical user interface—such as in order to reduce screen area allocated to this virtual representation of the physical user interface, thereby enabling the remote operator to focus on virtual representations of the (most) relevant displays and input fields on the physical user interface only and/or enabling the remote operator to view virtual representations of user interfaces on multiple production equipment units simultaneously within a single operator portal 180.

8. Remote Procedure

At the start of remote execution of a procedure at a production equipment unit by the remote operator via the system 100 and the operator portal 180, the operator portal 180 can: collect security information from the remote operator; validate the remote operator's credentials; and then access the system 100 via a computer network to enable remote control of the production equipment unit via commands entered at the operator portal 180 transmitted to the system 100.

Subsequently, the remote operator may: select virtual input fields within the virtual representation of the physical user interface rendered within the operator portal 180; and adjust positions, adjust states, or modify values of the virtual input fields according to steps of the procedure and/or states or values indicated on first displays depicted within the operator portal 180. Upon selection and adjustment of an input field, the remote operator can generate a command specifying this input field and representing the adjustment (e.g., the magnitude or value of the adjustment) and transmit this command to the system 100 via the computer network.

Upon receipt, the controller 160 can implement the interface model for the physical user interface to transform the command into a selector type and/or interpret lead-in, input field actuation, and lead-out trajectories (or motion of the selector 130 more generally) for the selector 130. The controller 160 can then autonomously orchestrate operation of the x-, y-, and z-axis actuators 120, etc. to load the selector type and/or to drive the selector 130 through the lead-in, input field actuation, and lead-out trajectories, thereby executing the command at the physical user interface according to the remote operator's input at the operator portal 180. The controller 160 can repeat the process for each command received from the operator portal 180 throughout this procedure.

8.1 Physical Input Reproduction

For example, during the procedure, the communication module 150 receives a first command—selected by the remote operator from a set of predefined commands defined in the interface model—from the operator portal 180.

The controller 160 then: retrieves a first lead-in trajectory, a first input field actuation trajectory, and a first lead-out trajectory associated with the first command; and locates the first lead-in trajectory, a first input field actuation trajectory, and a first lead-out trajectory relative to the first physical input field (e.g., a mechanical input or a virtual input on a physical display) on the physical user interface of the production equipment. More specifically, the controller 160 can define the first lead-in trajectory, the first input field actuation trajectory, and the first lead-out trajectory within the machine coordinate system of the system 100 based on: the location of the command defined in the physical user interface coordinate system by the interface model; and the stored offset between the machine coordinate system of the system 100 and the physical user interface coordinate system described above. Accordingly, the controller 160 can physically reproduce the first virtual input at the physical user interface of the production equipment unit by driving the set of actuators 120: to a start position of the first lead-in trajectory in the machine coordinate system; along the first lead-in trajectory to engage the first physical input field; along the first input field actuation trajectory to manipulate the first physical input field according to the first virtual input; and along the first lead-out trajectory to release the first physical input field.

8.2 Physical/Virtual User Interface Status Update

In one variation in which the virtual user interface 182 renders a graphical representation of the physical user interface (i.e., rather than a dewarped photographic image of the physical user interface), the controller 160 can: access a feed of images captured by the optical sensor 140; extract equipment and input field statuses from these images; and stream these statuses to the operator portal 180. The operator portal 180 can then update the graphical representation of the physical user interface according to these statuses.

For example, the optical sensor 140—arranged on the chassis 110 and facing the physical user interface—can capture a first image depicting the physical user interface at a first time. The controller 160 can then: access the first image; detect a first constellation of features (e.g., positions of physical or digital switch positions, values of sensor readouts) in the first image; and interpret a first set of system statuses of the production equipment unit at the first time based on the first constellation of features. The communication module 150 then broadcasts the first set of system statuses for access by the operator portal 180. Accordingly, the operator portal 180: renders a graphical representation of the physical user interface within the virtual user interface 182; accesses the first set of system statuses; and updates visual elements (e.g., virtual representations of physical switches, digital switches, sensor readouts) within the graphical representation of the physical user interface according to the first set of system statuses.

In this example, the controller 160 and the operator portal 180 can repeat this process for each image captured by the optical sensor 140 or on a regular interval (e.g., once per five-second interval). Alternatively, the controller 160 can: detect and extract system statuses from each image captured by the optical sensor 140; detect status changes between consecutive images; and transmit only status changes to the operator portal 180. Yet alternatively, the system 100 can broadcast these images to the operator portal 180, and the operator portal 180 can implement similar methods and techniques to extract system statuses from these images and to update the graphical representation of the physical user interface accordingly.

Thus, the optical sensor 140, the controller 160, and the operator portal 180 can cooperate to present current statuses of the production equipment unit to the remote operator via a graphical representation of the physical user interface, thereby enabling the remote operator to remotely monitor the production equipment unit before, during, and after inputting commands to the virtual user interface 182 during each step of the procedure.

In this variation, the system 100 and/or the operator portal 180 can also: capture a verification image of the physical user interface during a step of the procedure; implement methods and techniques described in U.S. patent application Ser. No. 17/478,817, filed on 17 Sep. 2021 and incorporated in its entirety by this reference, to detect and extract current values of sensor readouts from the verification image; and retrieve target or historical sensor ranges for this step of the procedure. Then, if a current sensor value deviates from a corresponding target or historical sensor range, the operator portal 180 can: flag the current step of the procedure; lockout a next step of the procedure; and transmit the verification image to a second operator portal 180—such as accessed by or associated with a second remote operator or the onsite operator—for verification of the current step of the procedure. The operator portal 180 and/or the system 100 can then enable the remote operator to progress to the next step of the procedure upon receipt of confirmation from the second operator portal 180.

8.3 Input Verification

Additionally or alternatively, the optical sensor 140, the controller 160, and the operator portal 180 can cooperate to capture and return a verification image of the physical user interface to the remote operator after executing a command, thereby enabling the remote operator to verify completion and accuracy of the command. The operator portal 180 can also prompt the remote operator to confirm the command before enabling the remote operator to access or initiate a next step of the procedure, as shown in FIG. 9B.

For example, the optical sensor 140 can capture a verification image of the physical user interface after the system 100 reproduces a first command received from the remote operator, as described above. The communication module 150 can broadcast the verification image for access by the operator portal 180, such as an original, photographic verification image or a dewarped photographic variant of the verification image. The operator portal 180 can then: access the verification image; render the verification image within the virtual user interface 182; and prompt the remote operator to confirm reproduction of a first virtual input—defined in the first command—at the physical user interface based on the verification image. Then, in response to confirmation of reproduction of the virtual input at the physical user interface by the remote operator, the operator portal 180 can unlock a next step of the procedure. However, if the remote operator indicates failed or incomplete reproduction of the first virtual input at the physical user interface, the operator portal 180 can return a command to the system 100 to recalibrate its position on the physical user interface, repeat emulation of the first command at the physical user interface, and return a second verification image of the physical user interface.

Additionally or alternatively, the system 100 can transmit the verification image to a second operator portal 180—such as accessed by or associated with a second remote operator or the onsite operator—for verification that the first command was fully and accurately reproduced at the production equipment unit before unlocking the next step of the procedure for the remote operator.

8.4 Command Pre-Verification

In a similar variation, in response to the remote operator entering a command at the virtual user interface 182 during the procedure, the operator portal 180 can transmit the command—such as in the form of a graphical representation or animation of the corresponding virtual input—to a second operator portal 180 for verification. For example, the operator portal 180 can transmit the command to a second operator portal 180 accessed by or associated with a second remote operator or the onsite operator for confirmation or verification of the command. If the second operator portal 180 returns confirmation to the operator portal 180, the operator portal 180 can release the command to the controller 160 for execution. Alternatively, the operator portal 180 can transmit the command to both the controller 160 and the second operator portal 180; and the controller 160 can execute the command only upon receipt of confirmation from the second operator portal 180.

8.5 Selector Position

In another variation shown in FIG. 9B, the controller 160 streams positions of the selector 130—over the physical user interface—to the operator portal 180, which then renders an icon representing the selector 130 over corresponding positions of the virtual user interface 182, thereby enabling the remote operator to: monitor the real-time position of the selector 130 during the procedure; and/or access an analog of proprioception of the remote operator's hands if physically interfacing within the physical user interface in the facility.

For example: the controller 160 can track real-time positions of the selector 130—over the physical user interface—in the physical user interface coordinate system during the procedure; and the communication module 150 can broadcast these real-time positions of the selector 130 for access by the operator portal 180 during the procedure. Accordingly, the operator portal 180 can render a visual icon representing the selector 130 (e.g., a virtual translucent dot, a virtual pointer)—such as over a raw photographic image feed of the physical user interface or over a graphical representation of the physical user interface derived from these images—based on real-time positions of the selector 130 broadcast by the communication module 150.

8.6 Input/Output Access

In another variation, the operator portal 180 can implement methods and techniques described below to selectively deactivate remote controls within a region of the virtual user interface 182 (i.e., reject or discard virtual inputs in this region of the virtual user interface 182) in order to prevent the remote operator from remotely controlling corresponding functions on the physical user interface or the production equipment unit.

For example, the operator portal 180 can redact regions of the graphical representation of the physical user interface or lock virtual inputs within these regions that correspond to inputs or functions of the production equipment unit not specified in the procedure, that the remote operator is not qualified to access, or flagged in the interface model as requiring physical presence at the production equipment unit to access.

Similarly, the operator portal 180 can obfuscate (e.g., redact, blur) regions of the virtual user interface 182 containing sensitive information in order to prevent the remote operator from remotely accessing such information, thereby securing this information. For example, the remote operator can redact or blur a region of the graphic representation of the physical user interface (and/or a raw or dewarped photographic image of the physical user interface) containing a contract or contractee identifier, a batch number, or sensitive or trade secret production equipment unit parameters, etc., such as: based on regions of the physical user interface containing sensitive data as defined in the procedure; or based on the remote operator's qualifications or login credentials.

9. Remote Operator Verification

In one variation in which an onsite operator has unlocked or setup the system 100 on the production equipment unit in preparation for remote completion of the procedure by the remote operator, the onsite operator may contact the remote operator, such as via a video teleconferencing system, to verify the remote operator's identity. For example, the system 100 can include an integrated display, and the controller 160 can host a video call between the local and remote operators via the integrated display. Alternatively the onsite operator may verify the remote operator identity via a mobile device executing video teleconferencing application. The remote operator may then provide authentication codes or personal information for access to the system 100, and the onsite operator may grant the remote operator access to the system 100 accordingly, such as by drawing the rack 112 into the active position or moving the interface shield 114 to the retracted position as described above.

In another implementation, the operator portal 180 interfaces with the remote operator to complete an authentication protocol prior to accessing the system 100, such as: a single- or multi-factor authentication protocol; facial recognition; fingerprint verification; and/or verification of IP address, computer type, SSID connection, corporate VPN connection, etc.

10. Live Image Feed of Physical User Interface as Virtual User Interface

In one variation shown in FIGS. 9A and 9B, the system 100 streams raw, composite, or dewarped photographic images of the physical user interface to the operator portal 180. The operator portal 180 then: renders this image stream within the virtual user interface 182 (rather than a graphical representation of the physical user interface); records virtual inputs entered by the remote operator over this image stream; generates commands based on these virtual inputs; and returns the commands to the system 100 for execution on the physical user interface.

10.1 Direct Image to System Coordinate Conversion

In one example: the optical sensor 140—arranged on the chassis 110 and facing the physical user interface—captures an image feed depicting the physical user interface; and the communication module 150 broadcasts the image feed for access by the operator portal 180. The operator portal 180—operating on a computing device remote from the production equipment unit—then: accesses the image feed; renders the image feed within the virtual user interface 182; and records a first virtual input position of the first virtual input—entered by the remote operator during a first step of the procedure—on a first image in the image feed rendered within the virtual user interface 182. The operator portal 180 can then: store the first virtual input position of the first virtual input—such as defined in physical user interface coordinate system based on positions of reference features present in the first image (e.g., bottom and left peripheral edges of the physical user interface)—in a first command; and returns the first command to the system 100 via the communication module 150.

Upon receipt of the command, the controller 160 then: extracts the first virtual input position from the first command; and converts the first virtual input position into a first longitudinal position and a first lateral position of the selector 130 within the machine coordinate system of the system 100. In particular, the controller 160 can convert the first longitudinal position and the first lateral position of the first virtual input—defined in the physical user interface coordinate system—into longitudinal and lateral machine coordinate positions based on the stored linear and angular offset between the machine coordinate system of the system 100 and the physical user interface coordinate system described above. The controller 160 then: triggers the set of actuators 120 to drive the selector 130 to these longitudinal and lateral machine coordinate positions; then triggers the set of actuators 120 to drive the selector 130 in a vertical direction to engage the first physical input field; and finally triggers the set of actuators 120 to withdraw the selector 130 in the vertical direction away from the physical user interface to complete reproduction of the first virtual input according to the first command.

More specifically, the controller 160 can: extract a first virtual two-dimensional position of the first virtual input from the first command; convert the first virtual two-dimensional position of the first virtual input at the virtual user interface 182 into a first longitudinal position and a first lateral position of a first input location on the physical user interface (e.g., a touch display); drive the set of actuators 120 to move the selector 130 to the first longitudinal position and the first lateral position; drive the set of actuators 120 to advance the selector 130 into contact with a surface of the touch display at the first physical input field on the physical user interface; and drive the set of actuators 120 to retract the selector 130 from the surface of the touch display.

10.2 Input and Command Maps

Alternatively, in this variation, the operator portal 180 can convert a location of a virtual input on a live image of the physical user interface into a command, such as based on a stored input-to-command map that links discrete regions in an image to the physical user interface into particular commands executable at the physical user interface. Upon receipt of a command from the operator portal 180, the controller 160 converts the command back into a machine-executable selector 130 path, such as based on: a) a stored command-to-input map that links particular commands to target input positions on the physical user interface (or to lead-in, input field actuation, and lead-out trajectories over the physical user interface, as described above); and b) the stored offset between the machine coordinate system of the system 100 and the physical user interface coordinate system described above.

In one example, the operator portal 180: accesses the input-to-command map for the physical user interface of the production equipment unit during the procedure; accesses a live feed of images captured by the optical sensor 140 in the system 100; aligns the input-to-command map to images of the physical user interface received from the system 100 (e.g., based on features detected in these images); renders these images of the physical user interface within the virtual user interface 182; records a virtual location of a first virtual input over a first image of the physical user interface; converts the virtual location of the first virtual input into a first command based on the input-to-command map; and then returns the first commands to the system 100.

In this example, the controller 160 then: accesses the command-to-input map for the physical user interface of the production equipment unit; converts the first command into a target input position on the physical user interface based on the command-to-input map; calculates a first set of motions based on a current position of the selector 130 and the target input position; and then drives the set of actuators 120 according to the first set of motions in order to reproduce the first virtual input at the physical user interface.

10.3 Virtual Input Access Limitations

As described above and shown in FIGS. 9A and 9B, the operator portal 180 can disable virtual inputs on select regions of images of the physical user interface during the procedure, such as based on: the remote operator's credentials or training qualifications; or controls not needed during or specified in the procedure.

In one example, the optical sensor 140—arranged on the chassis 110 and facing the physical user interface—captures an image feed depicting the physical user interface during the procedure; and the communication module 150 broadcasts this image feed for access by the operator portal 180. In this example, the operator portal 180—operating on a computing device remote from the production equipment unit—retrieves an input image mask linked or assigned to the procedure; accesses a first image in the image feed; locates a first inactive region on the first image based on the input image mask, such as by projecting the input image mask onto the first image; and renders the first image within the virtual user interface 182. Later, the operator portal 180 can similarly: access a second image in the image feed; locate a second inactive region on the second image based on the input image mask, such as by again projecting the input image mask onto the second image; and render the second image within the virtual user interface 182.

In this example, the operator portal 180 can: record a first virtual input position of a first virtual input—entered by the remote operator—on the first image and outside of the first inactive region of the first image; store the first virtual input position of the first virtual input in a first command; and return the first command to the system 100 for execution. Conversely, the operator portal 180 can discard a second virtual input—entered by the remote operator—within the second region in the second image flagged as inactive.

The operator portal 180 repeats this process for each image received from the system 100 during the procedure.

10.4 Visual Access Limits

As described above and shown in FIGS. 9A and 9B, the operator portal 180 can selectively obfuscate regions of images of the physical user interface during the procedure, such as based on: the remote operator's credentials or training qualifications; or redaction specifications defined in the procedure for trade secret and/or other sensitive information presented on the physical user interface during the procedure.

For example: the optical sensor 140—arranged on the chassis 110 and facing the physical user interface—can capture an image feed depicting the physical user interface; and the communication module 150 can broadcast the image feed for access by the operator portal 180. In this example, the operator portal 180—operating on a computing device remote from the production equipment unit—can retrieve a redaction image mask for the procedure and/or for the remote operator; access a first image in the image feed; obfuscate a first region on the first image based on the redaction image mask, such as by projecting the redaction image mask onto the first image; render the first image within the virtual user interface 182; and repeat this process for each subsequent image received from the system 100 during the procedure.

Furthermore, in this example, the operator portal 180 can: access an operator credential entered by the remote operator before or during the procedure; retrieve a data access level assigned to the remote operator based on the operator credential; and retrieve the redaction image mask for the procedure and/or corresponding to the data access level of the remote operator.

10.5 Digital File

In one variation shown in FIGS. 9A and 9B, the controller 160, the remote computer system, and/or the operator portal 180 further compiles remote operator credentials, virtual inputs, physical reproduction of virtual inputs, and images of the physical user interface, etc. into a digital file that forms an audit trail for the procedure completed at the production equipment unit.

In one implementation, the optical sensor 140—arranged on the chassis 110 and facing the physical user interface—captures an image feed depicting the physical user interface, such as at a rate of 10 Hz. In this implementation, the controller 160 can: initialize a digital file for the procedure at the production equipment unit; write an identifier of the remote operator to the digital file; write the image feed to the digital file; write commands received from the operator portal 180 to the digital file; and write timeseries motions of the selector 130 to the digital file, such as in real-time during the procedure. In response to completion of the procedure, the communication module 150 can then upload the digital file to a procedure database for storage and subsequent (or "post hoc") review.

Additionally or alternatively, the operator portal 180 can execute similar methods and techniques to generate and store a digital file linked to the procedure.

Additionally or alternatively, during the procedure: the system 100 can stream the image feed, positions of the selector 130, and/or motions of the actuators 120, etc. to the remote computer system; and the operator portal 180 can similarly stream virtual inputs, virtual input locations, and/or commands—generated within the virtual user interface 182—to the remote computer system. The remote computer system can then: distribute the image feed, selector 130 positions, and commands, etc. between the system 100 and the operator portal 180; compile these data into digital file linked to the procedure; and write this digital file to the procedure database for storage and subsequent review.

11. Variation: Robotic Arm

Figure 7:
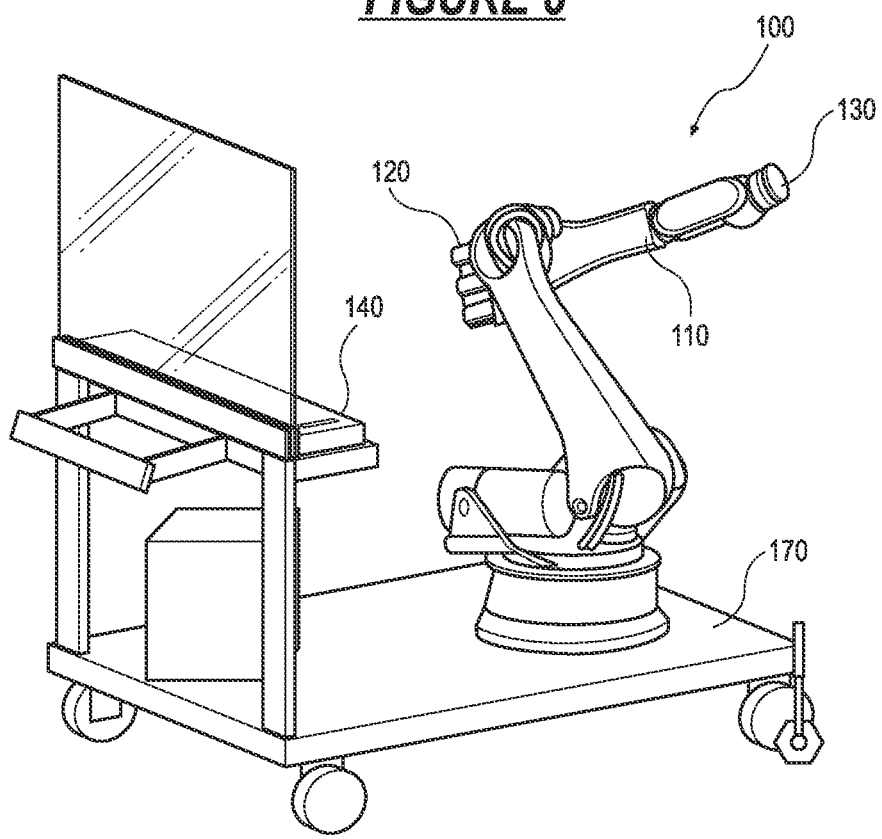
FIG. 7 is a schematic representation of one variation of the system.
Figure 8B:
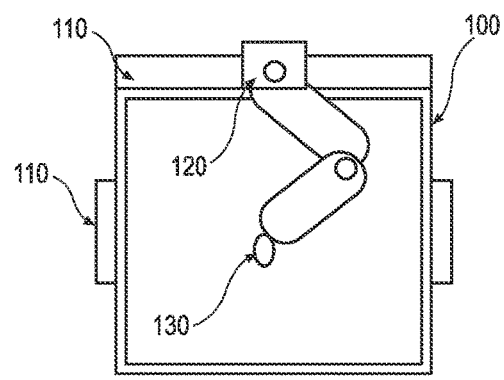
Figure 8C:
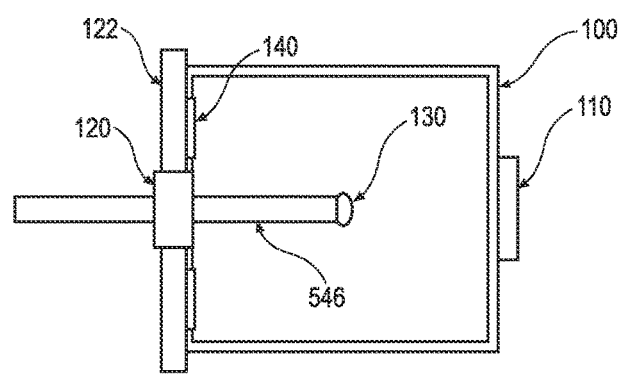
Figure 8D:
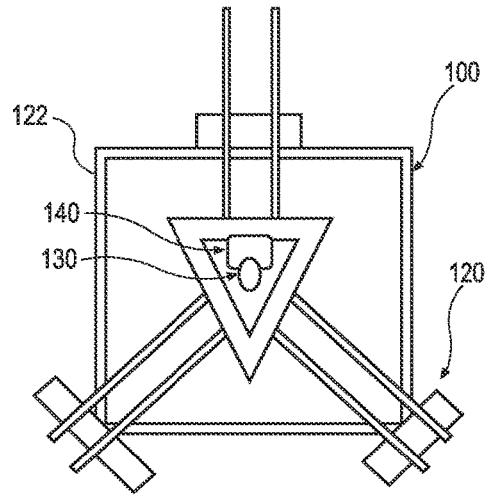

In one variation shown in FIGS. 7 and 8B, rather than a gantry 122 and a z-axis actuator 120, the system 100 includes a robotic arm, such as including: a set of arm segments; a set of joints interposed between adjacent arm segments; a set of actuators 120 configured to drive the set of joints over ranges of angular positions; and an end effector arranged on the distal end of a last arm segment and including the selector 130. In this variation, the controller 160 can implement methods and techniques similar to those described above to drive the end effector and the selector 130 through lead-in, input field actuation, and lead-out trajectories and thus manipulate input fields at the physical user interface according to commands entered by the remote operator via the operator portal 180.

12. Variation: Cart

In one variation shown in FIG. 7, the system 100 includes: a wheeled cart 170; and a lift (or "jack") mounted to the cart and supporting the gantry 122. In this variation, to deploy the system 100 to a production equipment unit and thus enable remote operation of the production equipment unit, an onsite operator may: wheel the cart up to the physical user interface on the production equipment unit; adjust the lift to vertically align the gantry 122 to the physical user interface; and lock wheels of the cart to fix the cart next to the physical user interface. Additionally or alternatively, the onsite operator may engage a latch 116, lock, or strap on the cart or gantry 122 to the production equipment unit or to the physical user interface specify in order to physically couple the gantry 122 to the physical user interface.

Furthermore, in this variation, once the system 100 is deployed to the production equipment unit, the controller 160 can: trigger the optical sensor 140 to capture an image of the physical user interface; identify a type of the physical user interface and the production equipment unit based on features extracted from the image; retrieve an interface model for executing commands at the physical user interface based on the physical user interface type; and register the interface model—and thus motion of the x, y-, and z-axis actuators 120 and the selector 130—to the physical user interface based on features detected in the image.

Additionally or alternatively, the remote operator may manually identify the production equipment unit, identify the physical user interface, select the interface model, and/or remotely control the x-, y-, and z-axis actuators 120 of the system 100 via the operator portal 180 to align the system 100 to the physical user interface, such as described above.

The system 100 can then implement methods and techniques described above to drive the end effector and the selector 130 through lead-in, input field actuation, and lead-out trajectories and thus manipulate input fields at the physical user interface according to commands entered by the remote operator via the operator portal 180.

For example, the chassis 110 includes a wheeled cart 170 configured for: mobile transport to the production equipment unit for execution of the procedure by the remote operator during a first time period; and mobile transport to a second production equipment unit for execution of a second procedure by a second remote operator during a second time period. Accordingly, in this example, the communication module 150 can execute methods and techniques described herein to receive a first series of commands during the procedure at the production equipment unit during the first time period (i.e., once the onsite operator wheels the cart up to the physical user interface of the first production equipment unit); and the controller 160 can drive the set of actuators 120 according to a first set of motions to physically reproduce a first series of virtual inputs—defined in the first series of commands—at the physical user interface of the production equipment unit during the first time period.

Similarly, in this example, the communication module 150 can receive a second series of commands during a second procedure at the second production equipment unit during the second time period (i.e., once the onsite operator wheels the cart up to the physical user interface of the second production equipment unit at a later time), wherein the second series of commands corresponds to a second series of virtual inputs entered by a second remote operator at a second virtual user interface 182, and wherein the second virtual user interface 182 represents the second physical user interface and is depicted within a second operator portal 180 remote from the second production equipment unit. The controller 160 can then: interpret a second set of motions of the selector 130 based on the second series of commands; and drive the set of actuators 120 according to the second set of motions to physically reproduce the second series of virtual inputs—defined in the second series of commands—at the second physical user interface of the second production equipment unit during the second time period.

In a similar example, the system 100 includes an articulated and adjustable robotic arm mounted on a mobile cart and configured for manual location near a first physical user interface of a production equipment unit followed by relocation to a second physical user interface of the production equipment unit during execution of corresponding steps of a procedure. In this example, the system 100 can include telescoping and/or articulating elements configured accommodate various heights, anglular positions, and/or sizes of these physical user interfaces within one production equipment unit or across various different production equipment units within the facility.

Furthermore, in this variation, once the remote operator completes a procedure at the production equipment unit via the system 100, the onsite operator may unlock the cart and withdraw the cart from the production equipment unit, thereby physically securing the system 100 and the production equipment unit against network intrusion.

Additionally or alternatively, the system 100 can further include: a set of rails arranged on the cart; and a sled supporting the gantry 122 (or the robotic arm) and configured to slide along the set of rails between a) an active position in which the sled locates the gantry 122 near the front of the cart to enable the selector 130 to access the physical user interface and b) a secured position in which the sled retracts the gantry 122 toward the rear of the cart to prevent the selector 130 from accessing the physical user interface. In this implementation, the system 100 can further include: a spring element configured to draw the sled from the active position into the secured position; a latch 116 configured to retain the sled in the active position; and a latch actuator controlled by the controller 160 and configured to release the latch 116 to enable the spring element to draw the sled into the secured position. Thus, in this implementation, the onsite operator may manually pull the retractable chassis 110 component into the active position in preparation for a procedure at the production equipment unit. A remote operator may then log in to the operator portal 180, access remote control of the system 100 via the operator portal 180, and remotely perform the procedure at the production equipment unit via the operator portal 180 and the system 100. When the remote operator completes the procedure, the remote operator may select a command at the operator portal 180 to disable the system 100, or the remote operator can automatically generate this command and return this command to the system 100. Upon receipt of this command, the controller 160 can automatically trigger the latch actuator to release the latch 116, thereby enabling the spring element to draw the retractable chassis 110 component back into the secured position. Because the system 100 excludes an actuator 120 to draw the retractable chassis 110 component into the active position, this action prevents the system 100 from entering further inputs into the production equipment unit until an onsite operator manually moves the retractable chassis 110 component back to the active position, thereby physically securing the system 100 and the production equipment unit against network intrusion. The onsite operator may then move the cart to a second production equipment unit in the facility in preparation for execution of a procedure at this second production equipment unit.

Furthermore, in this variation, the system 100 can include a robotic arm—rather than the gantry 122—mounted to the cart or sled and similar configured to enable the remote operator to remotely manipulate the physical user interface on the production equipment unit.

13. Actuator Array

Figure 8E:
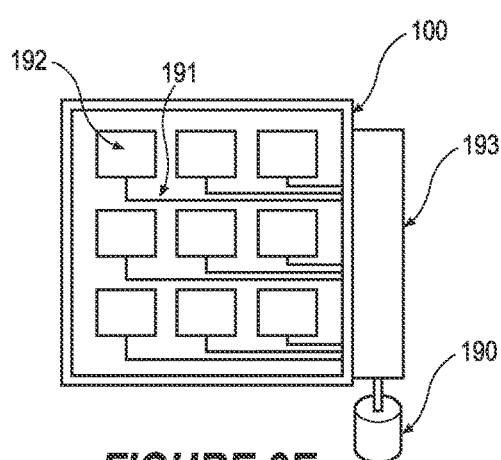

In yet another variation, shown in FIG. 8E the system 100 includes a flexible, multi-layered transparent film: configured to overlay the physical user interface of the physical user interface; including a set of pneumatic or hydraulic cavities 192 configured to fill with a fluid (e.g., air, alcohol, water); and defining an array of microfluidic channels 191 connected to each cavity. In this variation, the system further includes a set of valves 193 connected to the of microfluidic channels, a pump 190, and a reservoir that cooperate to selectively pump fluid into the cavities and thus enter physical inputs into a physical user interface responsive to commands received from the operator portal. In particular, the transparent film can apply physical inputs onto target regions of the physical user interface responsive to injection of fluid into corresponding cavities, which increases pressure within these cavities, applies pressure to adjacent regions of the physical user interface, and thus recreates physical inputs into the touchscreen based on commands received from the operator portal. Alternatively, the transparent film can interface with a touchscreen by pumping a conductive fluid (e.g., saline) into cavities to induce capacitance changes in corresponding, target regions of the touchscreen, thereby recreating physical inputs into the touchscreen based on commands received from the operator portal.

Figure 8F:
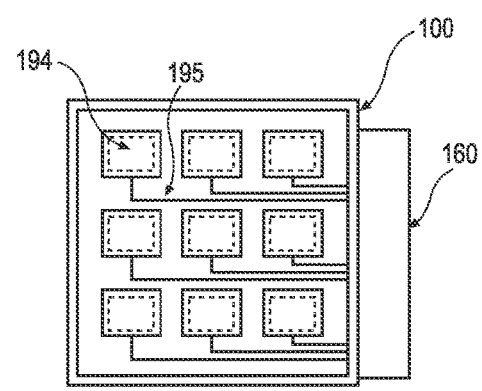

In a similar variation shown in FIG. 8F, the system 100 includes a flexible transparent film 195 containing an array of small and/or translucent actuators 194 configured selectively actuate responsive to electrical signals from the controller and thus make contact with the physical user interface to recreate physical inputs based on commands received from the operator portal.

Furthermore, in these variations, the system 100 can enable a local operator to view and interface with a physical user interface directly through the flexible transparent film and without (re)moving the system 100 from the physical user interface.

The systems and methods described herein can be embodied and/or implemented at least in part as a machine configured to receive computer-readable medium storing computer-readable instructions. The instructions can be executed by computer-executable components integrated with the application, applet, host, server, network, website, communication service, communication interface, hardware/firmware/software elements of an operator computer or mobile device, wristband, smartphone, or any suitable combination thereof. Other systems and methods of the implementation can be embodied and/or implemented at least in part as a machine configured to receive computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the implementations of the invention without departing from the scope of this invention as defined in the following claims.

I claim:

1. A system for remote operation of non-networked production equipment units comprises:
 a chassis configured to locate over a physical user interface of a production equipment unit, the physical user interface comprising a set of physical input fields;
 a set of actuators coupled to the chassis;

a selector manipulated by the set of actuators and configured to interface with the set of physical input fields;
an optical sensor:
   arranged on the chassis;
   facing the physical user interface; and
   configured to capture an image feed depicting the physical user interface;
a communication module configured to receive a first command during a procedure at the production equipment unit, the first command corresponding to a first virtual input entered by a remote operator at a virtual user interface, the virtual user interface representing the physical user interface and depicted within an operator portal remote from the production equipment unit; and
a controller configured to:
   access a first image feed from the optical sensor:
   access an image mask associated with the procedure:
   at an operator portal:
      a render the first image:
      obfuscate a first region on the first image based on the image mask; and
      record the first virtual input entered by the remote operator on a second region of the first image outside of the first region:
   interpret a first set of motions of the selector based on the first command; and
   drive the set of actuators according to the first set of motions to manipulate the selector across a first physical input field, in the set of physical input fields, on the physical user interface to physically reproduce the first virtual input at the physical user interface of the production equipment unit.

2. The system of claim 1:
further comprising:
   a rack supporting the set of actuators on the chassis and operable in:
      an advanced position to locate the selector over the physical user interface; and
      a retracted position to physically isolate the selector from the physical user interface; and
   a latch configured to retain the rack in the advanced position; and
wherein the controller is configured to trigger the latch to release the rack to the retracted position in response to conclusion of the procedure at the production equipment unit.

3. The system of claim 1:
further comprising:
   a rack supporting the set of actuators on the chassis and operable in:
      an advanced position to locate the selector over the physical user interface; and
      a retracted position to physically isolate the selector from the physical user interface; and
   a latch configured to retain the rack in the advanced position responsive to manual advancement of the rack from the retracted position to the advanced position; and
wherein the controller is configured to trigger the latch to release the rack to the retracted position in response to detection of one of:
   a security threat to the system;
   a security attack on the operator portal;
   a sequence of commands, received from the operator portal, that differ from historical sequences of actions associated with the procedure; and
   login by a user, at the operator portal, excluded from access to the production equipment unit via the virtual user interface.

4. The system of claim 1:
further comprising:
   an interface shield:
      mounted to the chassis;
      transparent to light in a visible spectrum; and
      operable in:
         an advanced position to locate over the physical user interface to isolate the physical user interface from input by the selector; and
         a retracted position to enable the selector to access the physical user interface; and
   a latch configured to retain the interface shield in the retracted position; and
wherein the controller is configured to trigger the latch to release the rack to the advanced position in response to conclusion of the procedure at the production equipment unit.

5. The system of claim 1, wherein the controller is configured to:
   interpret the first set of motions of the selector based on the first command by:
      extracting a first virtual two-dimensional position of the first virtual input from the first command; and
      converting the first virtual two-dimensional position of the first virtual input at the virtual user interface into a first longitudinal position and a first lateral position of a first input location on the physical user interface comprising a touch display; and
   physically reproduce the first virtual input at the physical user interface of the production equipment unit by:
      driving the set of actuators to move the selector to the first longitudinal position and the first lateral position;
      driving the set of actuators to advance the selector into contact with a surface of the touch display at the first physical input field on the physical user interface; and
      driving the set of actuators to retract the selector from the surface of the touch display.

6. The system of claim 5:
wherein the controller is configured to:
   access a calibration image of the physical user interface from the optical sensor;
   detect a constellation of features in the calibration image;
   register a coordinate system of the system relative to the constellation of features; and
   interpret the first set of motions of the selector based on the first command by converting the first virtual two-dimensional position of the first virtual input at the virtual user interface into the first longitudinal position and the first lateral position within the coordinate system.

7. The system of claim 1:
wherein the communication module is configured to receive the first command, selected from a set of predefined commands by the remote operator, from the operator portal; and
wherein the controller is configured to:
   interpret the first set of motions of the selector based on the first command by:
      retrieving a first lead-in trajectory, a first input field actuation trajectory, and a first lead-out trajectory associated with the first command; and locating the first lead-in trajectory, a first input field actuation trajectory, and a first lead-out trajectory relative to the first physical input field, comprising a mechanical input, on the physical user interface of the production equipment; and physically reproduce the first virtual input at the physical user interface of the production equipment unit by driving the set of actuators:
to a start position of the first lead-in trajectory;
along the first lead-in trajectory to engage the first physical input field;
along the first input field actuation trajectory to manipulate the first physical input field according to the first virtual input; and
along the first lead-out trajectory to release the first physical input field.

8. The system of claim 1:
further comprising a gantry:
configured to run on the chassis over a range of longitudinal positions greater than a height of the physical user interface; and
supporting the selector over a range of lateral positions and over a range of vertical positions on the chassis, the range of lateral positions greater than a width of the physical user interface; and
wherein the set of actuators comprises:
a first actuator configured to drive the gantry over the range of longitudinal positions;
a second actuator configured to drive the gantry over the range of lateral positions; and
a third actuator configured to drive the gantry over the range of vertical positions.

9. The system of claim 1:
further comprising the operator portal:
operable on a computing device remote from the production equipment unit; and
configured to:
access the image feed;
render the image feed within the virtual user interface;
record a first virtual input position of the first virtual input, entered by the remote operator during a first step of the procedure, on a first image in the image feed rendered within the virtual user interface; and
return the first command, containing the first virtual input position, to the communication module; and
wherein the controller is configured to:
interpret the first set of motions of the selector based on the first command by converting the first virtual input position into a first longitudinal position and a first lateral position of the selector within a coordinate system of the system; and
physically reproduce the first virtual input at the physical user interface of the production equipment unit by:
triggering the set of actuators to drive the selector to the first longitudinal position and the first lateral positions at a first time; and
triggering the set of actuators to drive the selector in a vertical direction to engage the first physical input field at a second time succeeding the first time.

10. The system of claim 9:
wherein the optical sensor is further configured to capture a verification image of the physical user interface at a third time succeeding the second time;
wherein the communication module is configured to broadcast the verification image for access by the operator portal; and
wherein the operator portal is further configured to:
access the verification image;
render the verification image within the virtual user interface;
prompt the remote operator to confirm reproduction of the first virtual input at the physical user interface of the production equipment unit based on the verification image; and
unlock a second step of the procedure, succeeding the first step of the procedure, in response to confirmation of reproduction of the first virtual input at the physical user interface of the production equipment unit by the remote operator.

11. The system of claim 9:
wherein the communication module is configured to broadcast real-time positions of the selector, over the physical user interface, for access by the operator portal; and
wherein the operator portal is further configured to render a visual icon, representing the selector, over the image feed based on real-time positions of the selector broadcast by the communication module.

12. The system of claim 1:
further comprising the operator portal:
operable on a computing device remote from the production equipment unit; and
configured to:
access a second image from the optical sensor;
locate a first inactive region on the second image based on the image mask;
record a second virtual input position of a second virtual input, entered by the remote operator at a first time, on the second image and outside of the first inactive region of the second image;
return a second command, containing the second virtual input position, to the communication module;
access a third image from the optical sensor;
locate a second inactive region on the third image based on the image mask;
render the third image within the virtual user interface; and
discard a third virtual input, entered by the remote operator, within the second inactive region in the third image.

13. The system of claim 1:
wherein the operator portal is further configured to:
access an input-to-command map for the physical user interface of the production equipment unit; and
convert the first virtual input into the first command based on the input-to-command map; and
wherein the controller is configured to interpret the first set of motions of the selector by:
accessing a command-to-input map for the physical user interface of the production equipment unit;
convert the first command into a target input position on the physical user interface based on the command-to-input map; and
calculate the first set of motions based on a current position of the selector and the target input position.

14. The system of claim 1, wherein the operator portal is further configured to:
access an operator credential entered by the remote operator;

retrieve a data access level of the remote operator based on the operator credential; and retrieve the image mask for the procedure and corresponding to the data access level of the remote operator.

15. The system of claim 1:

wherein the controller is configured to:
    detect a first constellation of features in the first image; and
    interpret a first set of system statuses of the production equipment unit at the first time based on the first constellation of features;

wherein the communication module is configured to broadcast the first set of system statuses for access by the operator portal; and further comprising the operator portal configured to:
    render a graphical representation of the physical user interface within the virtual user interface;
    access the first set of system statuses; and
    update visual elements within the graphical representation of the physical user interface according to the first set of system statuses.

16. The system of claim 1:

wherein the controller is further configured to:
    initialize a digital file for the procedure at the production equipment unit;
    write an identifier of the remote operator to the digital file;
    write the first image feed to the digital file;
    write commands received from the operator portal to the digital file; and
    write timeseries motions of the selector to the digital file; and wherein the communication module is configured to upload the digital file to a procedure database in response to completion of the procedure.

17. The system of claim 1:

wherein the chassis is configured to:
    transiently mount to the physical user interface of the production equipment unit during a first time period; and
    transiently mount to a second physical user interface of a second production equipment unit during a second time period;

wherein the communication module is configured to:
    receive the first command during the procedure at the production equipment unit during the first time period; and
    receive a second command during a second procedure at the second production equipment unit during the second time period, the second command corresponding to a second virtual input entered by a second remote operator at a second virtual user interface, the second virtual user interface representing the second physical user interface and depicted within a second operator portal remote from the second production equipment unit; and wherein the controller is configured to:
    drive the set of actuators according to the first set of motions to physically reproduce the first virtual input at the physical user interface of the production equipment unit during the first time period;
    interpret a second set of motions of the selector based on the second command; and
    drive the set of actuators according to the second set of motions to physically reproduce the second virtual input at the second physical user interface of the second production equipment unit during the second time period.

18. The system of claim 1:

wherein the chassis comprises a wheeled cart configured for
    mobile transport to the production equipment unit for execution of the procedure by the remote operator during a first time period; and
    mobile transport to a second production equipment unit for execution of a second procedure by a second remote operator during a second time period;

wherein the communication module is configured to:
    receive the first command during the procedure at the production equipment unit during the first time period; and
    receive a second command during a second procedure at the second production equipment unit during the second time period, the second command corresponding to a second virtual input entered by a second remote operator at a second virtual user interface, the second virtual user interface representing a second physical user interface of the second production equipment unit and depicted within a second operator portal remote from the second production equipment unit; and wherein the controller is configured to:
    drive the set of actuators according to the first set of motions to physically reproduce the first virtual input at the physical user interface of the production equipment unit during the first time period;
    interpret a second set of motions of the selector based on the second command; and
    drive the set of actuators according to the second set of motions to physically reproduce the second virtual input at the second physical user interface of the second production equipment unit during the second time period.

19. A system for remote operation of non-networked production equipment units comprises:

a chassis configured to transiently install over a physical user interface of a production equipment unit, the physical user interface comprising a set of physical input fields;

a set of actuators coupled to the chassis;

a selector manipulated by the set of actuators and configured to interface with the set of physical input fields;

an optical sensor arranged on the chassis, facing the physical user interface, and configured to capture an image feed depicting the physical user interface during a procedure at the production equipment unit;

a communication module configured to broadcast the image feed for access by an operator portal remote from the production equipment unit;

a controller configured to:
    access an the image feed from the optical sensor:
    access an image mask associated with the procedure:
    at the operator portal remote from the production equipment unit;
    a render the image feed:
    obfuscate a first region in the first image based on the image mask;
    receive a first command corresponding to a first virtual input and entered by the remote operator on a second region of the image feed outside of the first region:
    interpret a first set of motions of the selector based on the first command; and drive the set of actuators according to the first set of motions to manipulate the selector across a first physical input field, in the set of physical input fields, on the physical user interface and physically reproduce the first virtual input at the physical user interface of the production equipment unit.

20. A system comprising:
a set of actuators coupled to a chassis of a production equipment unit;
a selector:
  manipulated by the set of actuators; and
  configured to interface with a set of physical input fields at a physical user interface of the production equipment unit;
an optical sensor defining a field of view intersecting the physical user interface and configured to capture images of the physical user interface; and
a controller configured to:
  access an image mask associated with the production equipment unit;
  access an image from the optical sensor depicting the physical user interface;
  at a remote operator portal:
    render the first image;
    define an inactive region on the first image based on the image mask; and
    receive a first virtual input and entered by the remote operator on a second region of the image feed outside of the first region;
  interpret a first set of motions of the selector based on the first virtual input; and
  drive the set of actuators according to the first set of motions to:
    manipulate the selector across a first physical input field, in the set of physical input fields, on the physical user interface; and
    physically reproduce the first virtual input at the physical user interface of the production equipment unit.

* * * * *